US011752521B2

(12) United States Patent
Geyer et al.

(10) Patent No.: US 11,752,521 B2
(45) Date of Patent: Sep. 12, 2023

(54) SYSTEMS AND METHODS FOR SORTING OBJECTS TO LARGE NUMBERS OF ORDERS

(71) Applicant: Berkshire Grey Operating Company, Inc., Bedford, MA (US)

(72) Inventors: Christopher Geyer, Arlington, MA (US); Joseph Romano, Arlington, VA (US); John Richard Amend, Jr., Belmont, MA (US); Christopher Buck, Stow, MA (US); Andrew Ewart, Stratham, NH (US); Kyle Maroney, North Attleboro, MA (US); Thomas Wagner, Concord, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 239 days.

(21) Appl. No.: 16/986,984

(22) Filed: Aug. 6, 2020

(65) Prior Publication Data
US 2021/0039140 A1    Feb. 11, 2021

Related U.S. Application Data

(60) Provisional application No. 62/884,353, filed on Aug. 8, 2019.

(51) Int. Cl.
*B07C 3/08* (2006.01)
*B07C 3/00* (2006.01)
(Continued)

(52) U.S. Cl.
CPC ............... *B07C 3/08* (2013.01); *B07C 3/008* (2013.01); *B07C 5/18* (2013.01); *B65G 13/02* (2013.01);
(Continued)

(58) Field of Classification Search
CPC .. B07C 3/08; B07C 3/008; B07C 5/18; B07C 5/36; B07C 5/3412; B07C 5/362;
(Continued)

(56) References Cited

U.S. PATENT DOCUMENTS 4,846,335 A    7/1989   Hartlepp
4,895,242 A    1/1990   Michel
(Continued)

FOREIGN PATENT DOCUMENTS

CN    105618384 A       6/2016
CN    107096721 A   *   8/2017
(Continued)

OTHER PUBLICATIONS

International Search Report and Written Opinion issued by the International Searching Authority in related International Application No. PCT/US2020/045214 dated Nov. 16, 2020, 13 pages.
(Continued)

*Primary Examiner* — Gene O Crawford
*Assistant Examiner* — Muhammad Awais
(74) *Attorney, Agent, or Firm* — Gesmer Updegrove LLP

(57) ABSTRACT

An order fulfillment system is disclosed in which objects to be collected into orders are provided in output totes. The system includes a primary sortation system that includes a loop conveyance system that moves objects around a closed loop that includes a plurality of primary sortation exits, each of which leads to a location inside the closed loop, and a secondary sortation system that includes a plurality of secondary conveyances, each of which receives an object at one of the plurality of primary sortation exits, and conveys the object to one of a plurality of totes, the plurality of totes being within the closed loop of the primary sortation system.

39 Claims, 23 Drawing Sheets

(51) Int. Cl.
  *B07C 5/18* (2006.01)
  *B65G 13/02* (2006.01)
  *B65G 15/02* (2006.01)
  *B65G 15/42* (2006.01)

(52) U.S. Cl.
  CPC .............. *B65G 15/02* (2013.01); *B65G 15/42* (2013.01); *B65G 2201/0258* (2013.01); *B65G 2207/18* (2013.01)

(58) Field of Classification Search
  CPC ........ B07C 3/082; B65G 13/02; B65G 15/02; B65G 15/42; B65G 2201/0258; B65G 2207/18; B65G 47/54; B65G 47/96; B65G 54/02; B65G 1/1378
  USPC ........................................................ 209/645
  See application file for complete search history.

(56) References Cited

U.S. PATENT DOCUMENTS

| | | | |
|---|---|---|---|
| 5,190,162 A | 3/1993 | Hartlepp | |
| 5,672,039 A * | 9/1997 | Perry | B65G 47/962 |
| | | | 414/280 |
| 5,839,566 A | 11/1998 | Bonnet | |
| 5,990,437 A | 11/1999 | Coutanant et al. | |
| 6,246,023 B1 | 6/2001 | Kugle | |
| 6,323,452 B1 | 11/2001 | Bonnet | |
| 6,377,867 B1 | 4/2002 | Bradley et al. | |
| 6,390,756 B1 | 5/2002 | Isaacs et al. | |
| 6,579,053 B1 | 6/2003 | Grams et al. | |
| 6,688,459 B1 | 2/2004 | Bonham et al. | |
| 6,762,382 B1 | 7/2004 | Danelski | |
| 7,861,844 B2 | 1/2011 | Hayduchok et al. | |
| 8,776,694 B2 | 7/2014 | Rosenwinkel et al. | |
| 9,102,336 B2 | 8/2015 | Rosenwinkel | |
| 10,029,865 B1 | 6/2018 | McCalib, Jr. et al. | |
| 10,232,409 B2 * | 3/2019 | Dugat | B65G 13/12 |
| 10,576,621 B2 | 3/2020 | Wagner et al. | |
| 10,583,553 B2 | 3/2020 | Wagner et al. | |
| 10,611,021 B2 | 4/2020 | Wagner et al. | |
| 10,646,991 B2 | 5/2020 | Wagner et al. | |
| 2002/0179502 A1 | 12/2002 | Cerutti et al. | |
| 2011/0144798 A1 * | 6/2011 | Freudelsperger | B65G 1/08 |
| | | | 700/218 |
| 2014/0249666 A1 * | 9/2014 | Radwallner | B65G 1/137 |
| | | | 700/216 |
| 2015/0217334 A1 * | 8/2015 | Kim | B07C 3/08 |
| | | | 209/552 |
| 2017/0057756 A1 | 3/2017 | Dugat et al. | |
| 2017/0121113 A1 | 5/2017 | Wagner et al. | |
| 2017/0235282 A1 * | 8/2017 | Choi | B65G 47/962 |
| | | | 700/224 |
| 2017/0349385 A1 * | 12/2017 | Moroni | B65B 35/36 |
| 2017/0361356 A1 * | 12/2017 | Aschpurwis | B65G 47/46 |
| 2018/0085788 A1 * | 3/2018 | Engel | B07C 1/025 |
| 2018/0105363 A1 * | 4/2018 | Lisso | B65G 47/643 |
| 2018/0127219 A1 * | 5/2018 | Wagner | B65G 47/40 |
| 2018/0148272 A1 * | 5/2018 | Wagner | B65G 47/256 |
| 2018/0265291 A1 | 9/2018 | Wagner et al. | |
| 2018/0265311 A1 | 9/2018 | Wagner et al. | |
| 2018/0273295 A1 | 9/2018 | Wagner et al. | |
| 2018/0273298 A1 | 9/2018 | Wagner et al. | |
| 2019/0022702 A1 | 1/2019 | Vegh et al. | |
| 2019/0060959 A1 * | 2/2019 | Imazu | B65G 11/203 |

FOREIGN PATENT DOCUMENTS

| | | | | | |
|---|---|---|---|---|---|
| CN | 107583882 A | | 1/2018 | | |
| CN | 207138310 U | | 3/2018 | | |
| CN | 108838094 A | * | 11/2018 | ............. | B07C 3/008 |
| CN | 109499895 A | * | 3/2019 | | |
| CN | 109661358 A | | 4/2019 | | |
| CN | 109719040 A | * | 5/2019 | | |
| CN | 109719041 A | * | 5/2019 | ............... | B07C 3/08 |
| KR | 20180056945 A | * | 5/2018 | | |

OTHER PUBLICATIONS

International Preliminary Report on Patentability issued by the International Bureau of WIPO in related International Application No. PCT/US2020/045214 dated Feb. 8, 2022, 8 pages.

Communication pursuant to Rules 161(1) and 162 EPC issued by the European Patent Office in related European Patent Application No. 20761022.1 dated Mar. 18, 2022, 3 pages.

Notice on the First Office Action issued by the China National Intellectual Property Administration in related Chinese Patent Application No. 202080053320.7 dated Feb. 27, 2023, 30 pages.

Examiner's Report issued by the Innovation, Science and Economic Development Canada (the Canadian Intellectual Property Office) in related Canadian Patent Application No. 3,150,068 dated Mar. 17, 2023, 5 pages.

* cited by examiner

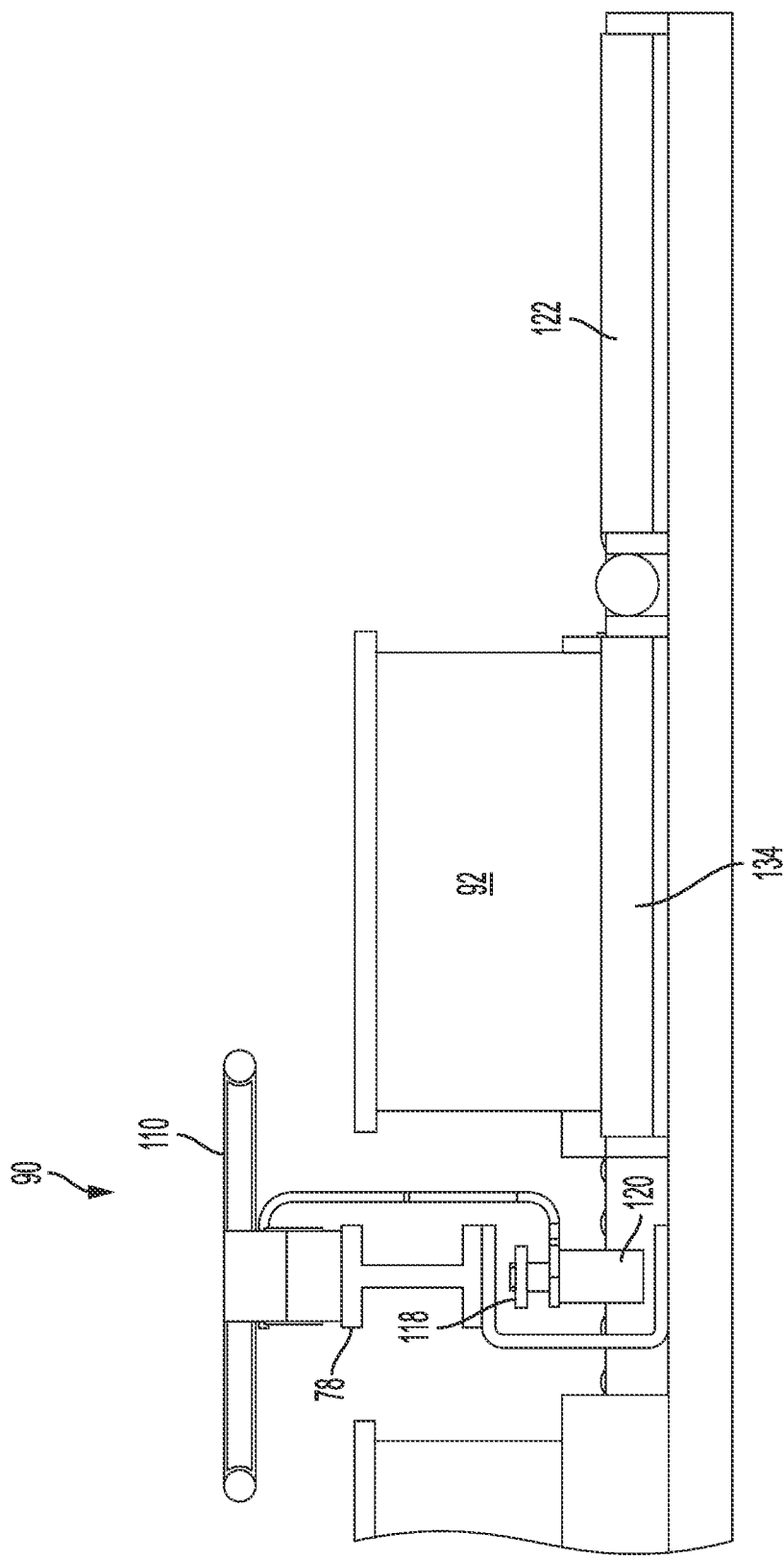

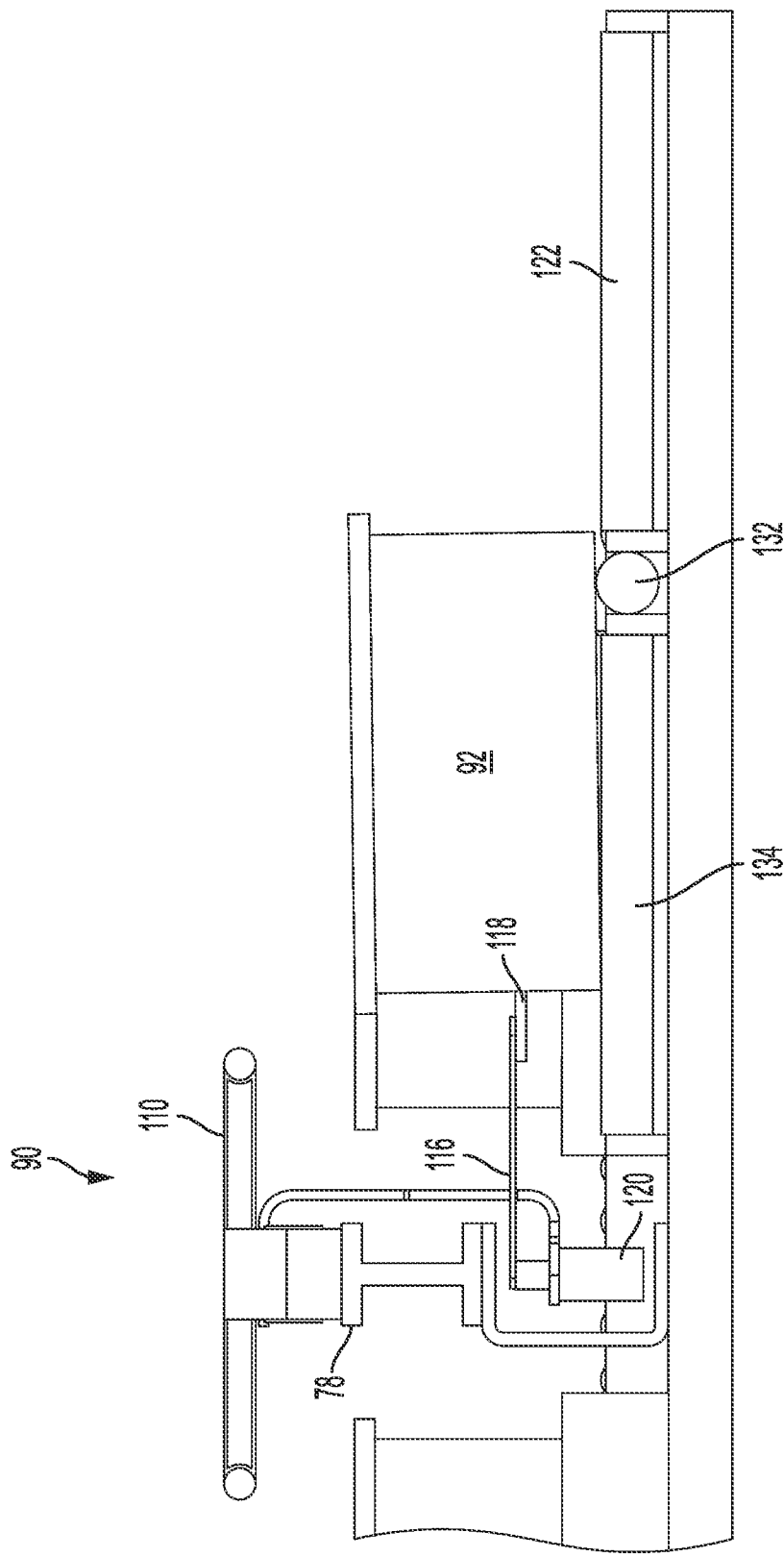

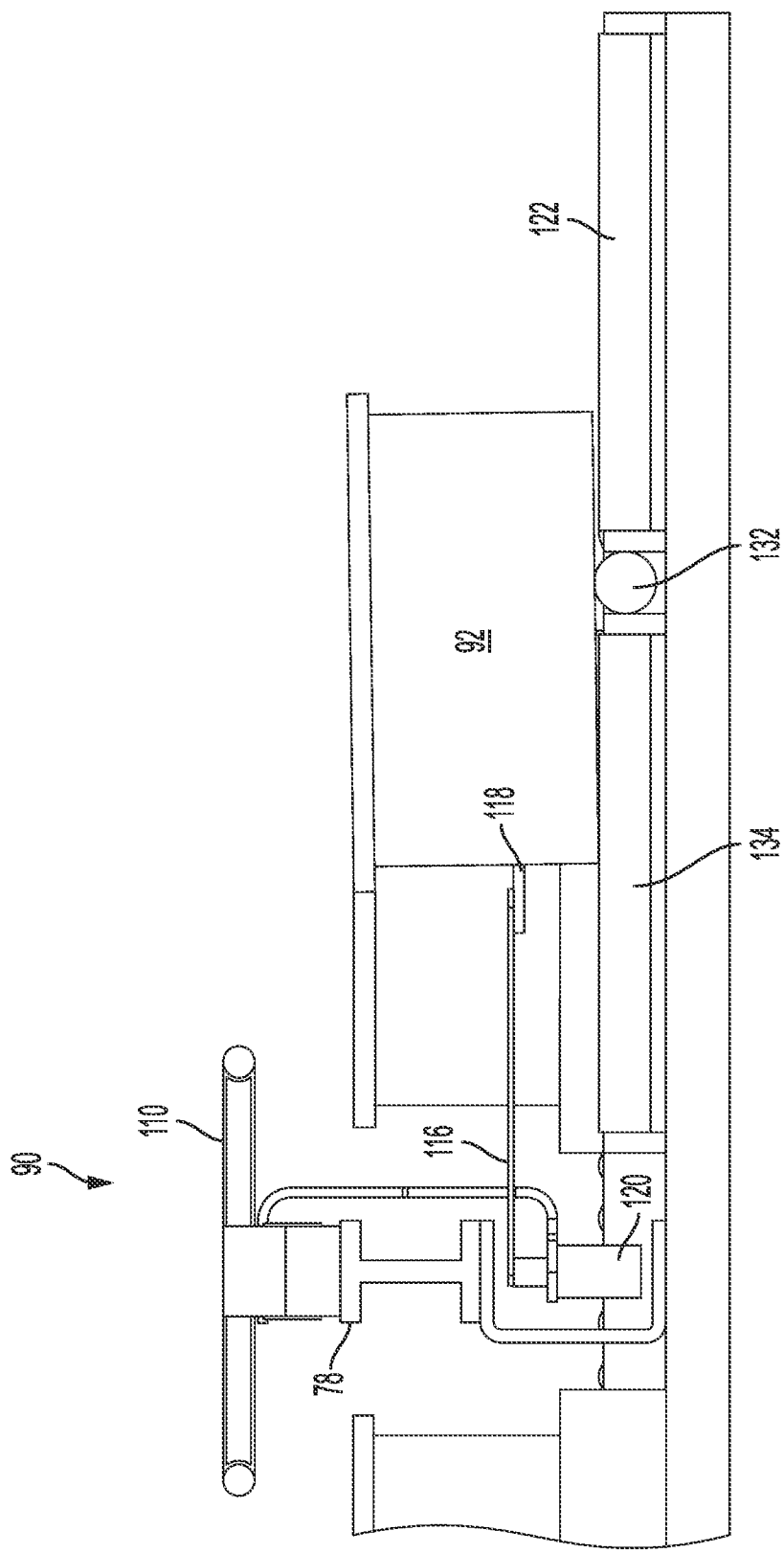

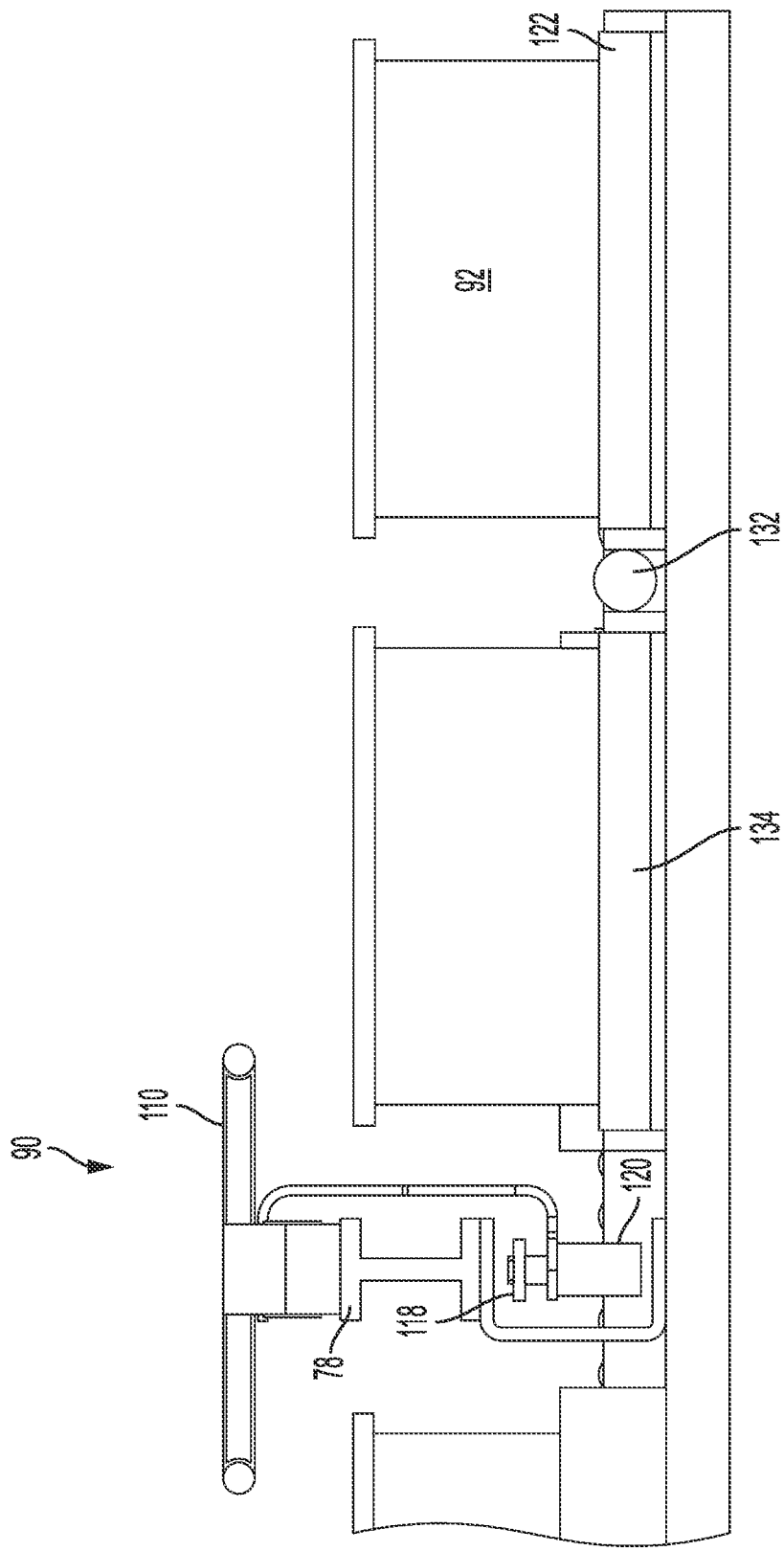

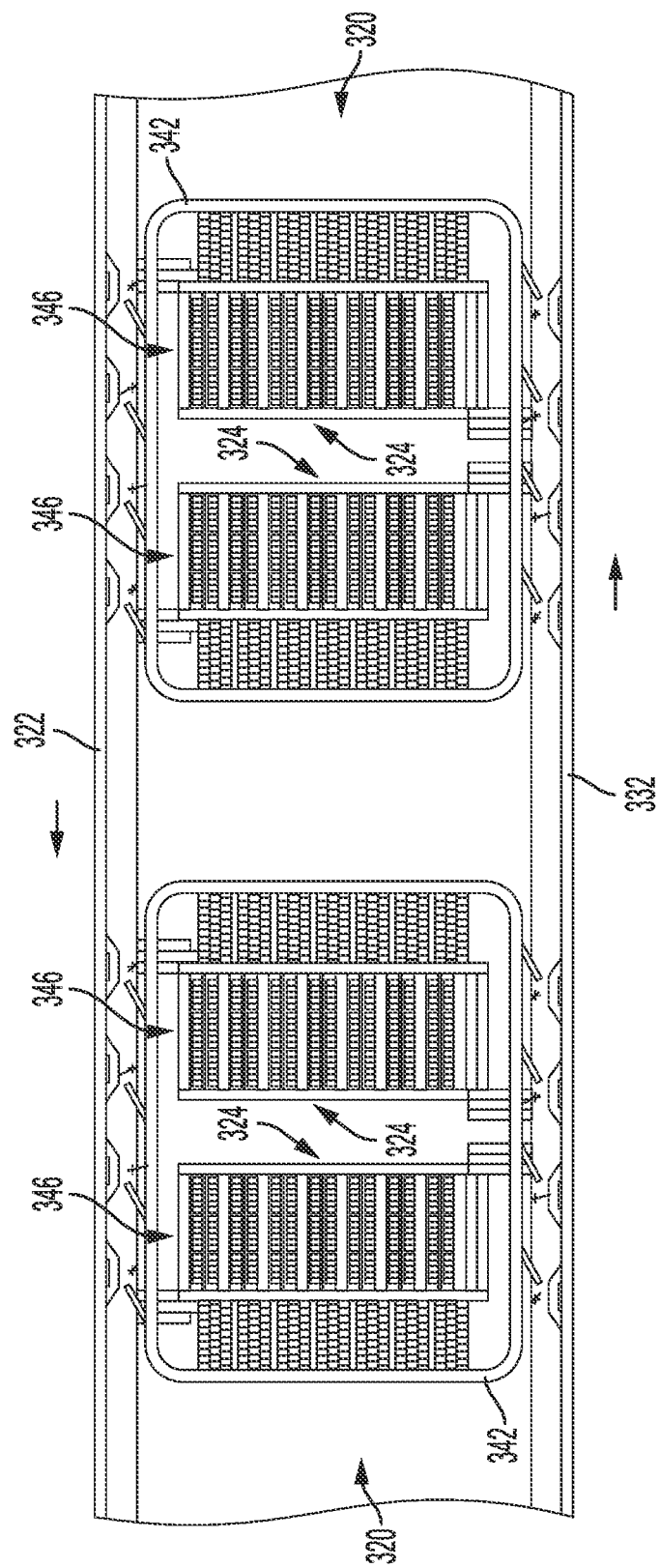

SYSTEMS AND METHODS FOR SORTING OBJECTS TO LARGE NUMBERS OF ORDERS

PRIORITY

The present application claims priority to U.S. Provisional Patent Application Ser. No. 62/884,353 filed Aug. 8, 2019, the disclosure of which is hereby incorporated by reference in its entirety.

BACKGROUND

The invention generally relates to order fulfillment centers and systems, and relates in particular to e-commerce order fulfillment systems and methods.

An order fulfillment center holds inventory and ships from inventory packages that fulfill customers' orders. Inventory may be held on shelves and picked manually, or may be held in automated storage and retrieval systems (AS/RS).

The picking of orders may be achieved in a variety of ways, for example, employing human personnel. Personnel may generally employ batch picking (pick less, sort now) or wave picking (pick more, sort later). In particular, in places where personnel are manually picking units from shelves, it is common to optimize the efficiency of the walking and picking process, so that as many goods as possible are picked while walking up and down aisles of shelves. In batch picking, personnel may push a cart up and down the aisles that will hold bins for multiple individual orders. When the personnel arrives at the location of a unit needing to be picked, he or she will pick that unit and place it into the tote or bin corresponding to the order. In this case, the worker is sorting the unit into the correct order. At the end of the tour through the shelves, all of the orders on the cart will be complete—no units will remain to be picked for those orders—and all units will be sorted into orders, and ready to be shipped. FIG. 1, for example, shows at 10 a route 12 that a human personnel may take walking through a warehouse filled with objects 14 on shelves 16. The person's efficiency is determined by the density of picks on the shelves. In wave picking, personnel pick any open units in his or her walk through the shelves, as opposed to batch picking where he or she only picks units that belong to orders in their cart.

Batch picking works when the number of outgoing orders is small. In batch picking however, personnel may be walking by units on the shelves that are needed for some other order that does not fit onto the worker's cart. There is no room on the cart for an additional tote into which to put the passed-by unit. It is typically impractical to push around a cart holding more than a dozen or so orders. In wave picking the job of sorting units into orders is shifted downstream—the units are sorted later. Instead, personnel pick any outstanding units. The personnel who does the picking does not do any sorting into individual orders. Instead, the totes containing units from many different orders are sent by conveyor to a sorting and packing area, where the picked units are sorted into their respective orders and then packed for shipping. Typically a large number—sometimes thousands—of outstanding orders are taken to be open at a time, and all the units for those open orders are picked. The number of open orders is the wave size.

In batch picking, more time is spent walking for the same number of picks, compared with wave picking. Wave picking can be much more efficient for a large number of units and orders. There is a tradeoff involving the wave size. The larger the wave size, then the higher the density of picks in a walk down an aisle. Only a limited number of units however, may be sorted into a given number of orders in a given timeframe and footprint. The more units or the more orders, generally the greater the footprint and manpower to do the sorting. A key question for order fulfillment facility design is how to cost-effectively sort many thousands of units per hour into many thousands of orders.

When the system employs the process of picking now and sorting later, the system may rely on unit sorters. A unit sorter is a complex material handling system that sorts units into one of many destinations. A cross-belt sorter is an example of a unit sorter that consists of a train of small sections of conveyor belts arranged in a loop, where each section of conveyor can convey units transversally to destinations. Units, for example, may be placed onto a single cross-belt, and then when the section of conveyor arrives at the unit's destination, the conveyor belt (or train of short conveyor belts) drives the unit off of the belt and down a chute corresponding to the correct destination for the unit. In this way, many thousands of units can be sorted into one of many hundreds of destinations per hour. Other examples of unit sorters include tilt-tray sorters and bomb-bay sorters. In tilt-tray sorters, units ride trays that tilt left or right relative to the direction of motion of the looping trays. In a bomb-bay sorter, the units are placed on doors that open when the unit arrives at the correct destination.

When looked at in terms of cost per destination, bomb-bay, cross-belt and tilt-tray sorters are typically very expensive to make. Each additional destination chute incurs significant cost. Typically there is an electrical actuator for every single destination. In a cross-belt sorter, the actuator manipulates a latching component that, when extended, can induce left or right motion of the belt. Similar mechanisms are used for the tilt-tray and bomb-bay sorters. This requires significant complexity, as each destination chute needs an actuator, a mechanism, a power supply and other wiring.

Unit sorters, however, are generally more economical to employ because they enable a more efficient wave picking process. Even so, the wave size is often much larger than the number of destinations one can afford to buy in the unit sorter. A further challenge with unit sorters is that systems employing many unit sorters become expensive per destination, even though the more destinations you can sort to, the larger the wave size can be, and then the more efficient picking can be. Further sortation systems include automated movement to sortation destinations, such as disclosed, for example, in U.S. Pat. No. 7,861,844. Such automated sortation systems however, require complex movement of individual delivery vehicles in horizontal and vertical directions.

There remains a need therefore, for systems and methods that reduce operating expenses, yet provide approaches that have system costs that are affordable and provide a return on investment. Such systems and methods should ideally i) create a solution that vastly increases the number of destinations that can be automatically sorted to, and that is scalable, ii) automatically handle the units end-to-end, and automatically singulate and induct units into the system, iii) automatically discharge order totes from the system to eliminate manual chute servicing, iv) where possible, use existing, off-the-shelf unit transport technology and v) use footprint efficiently, and exploit vertical space.

SUMMARY

In accordance with an aspect, the invention provides an order fulfillment system in which objects to be collected into orders are provided in output totes. The system includes a primary sortation system that includes a loop conveyance system that moves objects around a closed loop that includes a plurality of primary sortation exits, each of which leads to a location inside the closed loop, and a secondary sortation system that includes a plurality of secondary conveyances, each of which receives an object at one of the plurality of primary sortation exits, and conveys the object to one of a plurality of totes, the plurality of totes being within the closed loop of the primary sortation system.

In accordance with another aspect, the invention provides an order fulfillment system in which objects to be collected into orders are provided in output totes. The system includes an input conveyance system, a primary sortation system, a secondary sortation system, and an output tote conveyance system. The input conveyance system moves objects toward a loop conveyance system generally along a first input direction. The primary sortation system includes the loop conveyance system and that moves objects around a closed loop that includes a plurality of primary sortation exits, each of which leads to a location inside the closed loop. The secondary sortation system includes a plurality of secondary conveyances, each of which receives an object at one of the plurality of primary sortation exits and provides objects to one of a plurality of totes. The output tote conveyance system is for moving completed totes within the closed loop in a direction that is generally transverse to the input direction.

In accordance with yet another aspect, the invention provides an order fulfillment system in which objects to be collected into orders are provided in output totes. The system includes an input conveyance system, a primary sortation system, a secondary sortation system, and an output tote conveyance system. The input conveyance system moves objects from an input conveyance system. The primary sortation system includes the loop conveyance system and that moves objects around a closed loop that includes a plurality of primary sortation exits, each of which leads to a location inside the closed loop. The secondary sortation system includes a plurality of secondary conveyances, each of which receives an object at one of the plurality of primary sortation exits and provides objects to one of a plurality of totes, said plurality of secondary conveyances being provided on a plurality of vertically stacked layers. The output tote conveyance system is for moving completed totes within the closed loop to an output location.

In accordance with a further aspect, the invention provides a method of providing order fulfillment in which objects to be collected into orders are provided in output totes. The method includes: moving objects toward a loop conveyance system generally along a first input direction, moving objects around a closed loop that includes a plurality of primary sortation exits, each of which leads to a location inside the closed loop, receiving objects at a plurality of secondary conveyances, each of which receives an object at one of the plurality of primary sortation exits and provides objects to one of a plurality of totes, and moving completed totes within the closed loop in a direction that is generally transverse to the input direction.

BRIEF DESCRIPTION OF THE DRAWINGS

The following description may be further understood with reference to the accompanying drawings in which:

FIGS. 11A-11D shows illustrative diagrammatic side views of the tote kicker of FIG. 9 (FIG. 11A) engaging the tote (FIG. 11B), moving the tote (FIG. 11C), and permitting the opened location to be filled by a new tote (FIG. 11D);

FIG. 19 shows an illustrative diagrammatic view of a processing system in accordance with a further aspect of the invention that includes a plurality of order fulfillment systems.

The drawings are shown for illustrative purposes only.

DETAILED DESCRIPTION

In accordance with an aspect of the invention, systems are provided for order fulfillment in which objects to be collected into orders are provided in output totes. The system includes an input conveyance system, a primary sortation system, a secondary sortation system, and an output tote conveyance system. The input conveyance system moves objects toward a loop conveyance system generally along a first input direction. The primary sortation system includes the loop conveyance system and that moves objects around a closed loop that includes a plurality of primary sortation exits, each of which leads to a location inside the closed loop. The secondary sortation system includes a plurality of secondary conveyances, each of which receives an object at one of the plurality of primary sortation exits and provides objects to one of a plurality of totes. The output tote conveyance system is for moving completed totes within the closed loop in a direction that is generally transverse to the input direction.

Applicants have discovered that a sorting process may be provided that includes a primary sort and a secondary sort, using for example a hybrid model. Such a hybrid model may involve cascading automated and manual sorting, and thereby split sorting into a primary and secondary sort. In the primary sort, use a unit sorter to automatically sort to 1 of N, where N is typically in the hundreds. In the secondary sort, use people to manually sort to 1 of M destinations, where M is typically 10 or less, but can be more. This cascaded sort enables sorting into 1 of M×N destinations. It is enabled via a hybrid automated-manual approach that leverages a fast, automated solution with a more cost-effective per destination manual process, which boosts the total number of destinations. In the manual secondary sort, a worker receives a tote filled with up to M orders, where M is typically between 6 to 10. The personnel sorts the items into orders, and in combined sort and packing stations, packs the orders to be shipped. The cascaded sort is a result of a balance between the capital expenses of the automated material handling system versus the operating expenses of manual labor.

Building on this discovery, the invention provides a fully automated sortation system for sorting many units into many orders in accordance with an aspect of the present invention. The system is a completely automated solution, but automates the sorting with fewer expensive components than a unit-sorter solution. The system employs a cascade approach similar to the hybrid automated/manual approach, and includes scalable building components, including a shuttle module, a shuttle wall built of layered shuttle modules, and an automated order sortation system, in conjunction with a cross-belt sorter and robotic induction stations.

Figure 1:
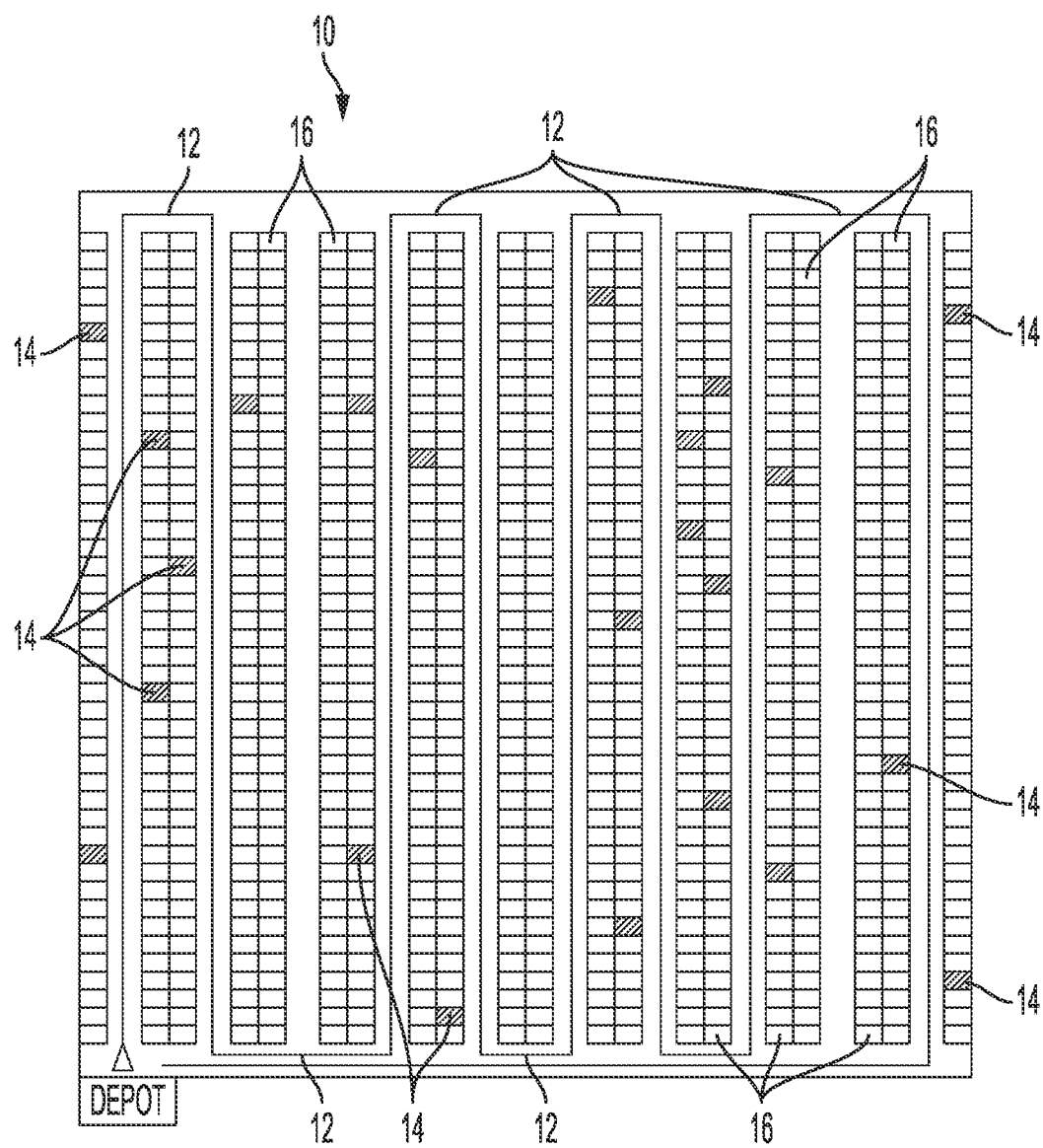
FIG. 1 shows an illustrative diagrammatic view of an object picking route in accordance with the prior art.
Figure 2:
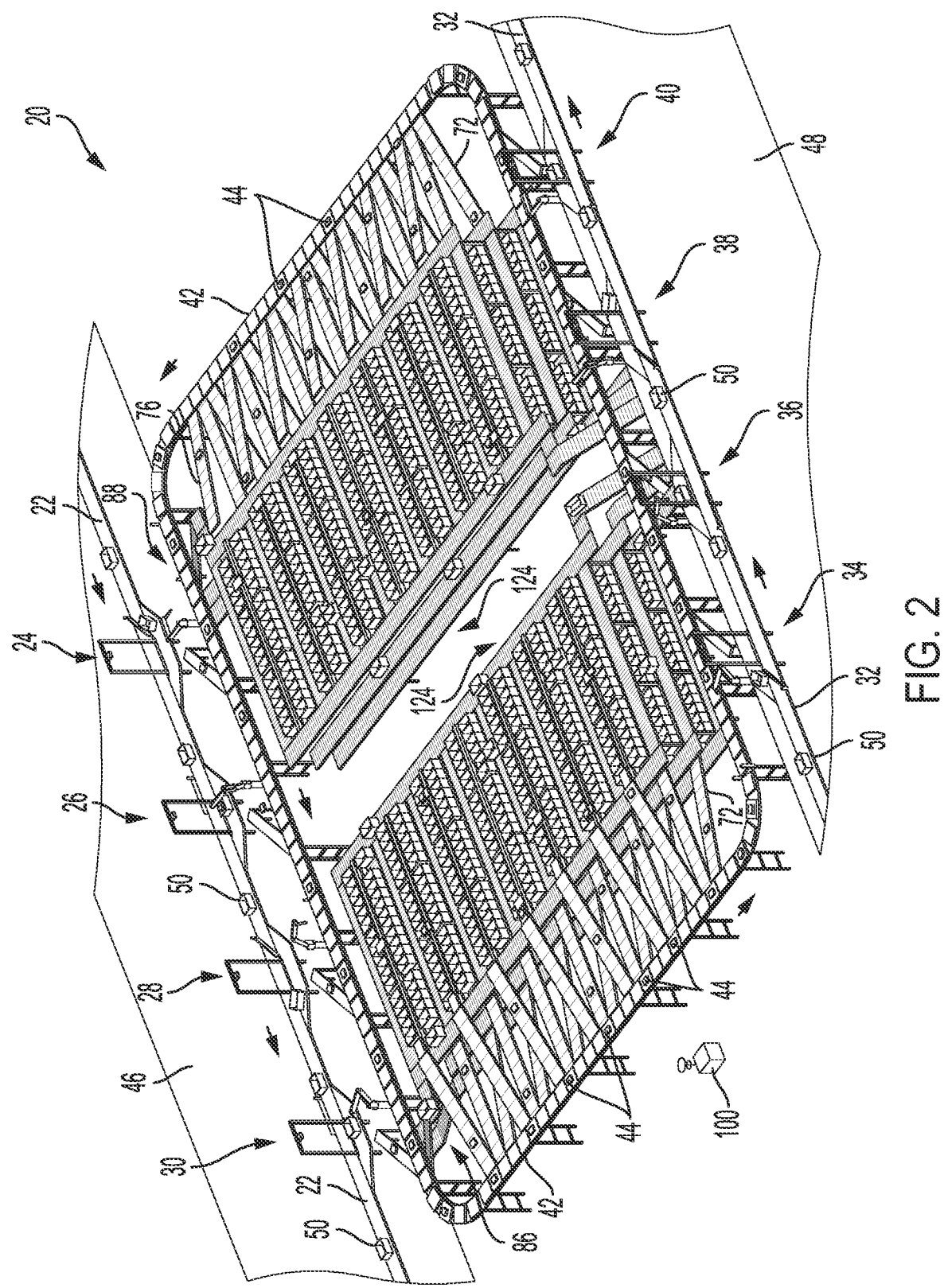
FIG. 2 shows an illustrative diagrammatic view of an order fulfillment system in accordance with an aspect of the present invention.

FIG. 2 for example, shows a system 20 that includes a pair of object in-feed conveyors 22, 32, along which in-feed processing stations 24, 26, 28, 30 and 34, 36, 38, 40 are provided. The object in-feed conveyors 22, 32, provide input bins or totes 50 in which objects are provided to the system 20. The object in-feed conveyors and in-feed processing stations are provided on in-feed floors 46, 48 below which empty bins or totes are provided to the system and completed bins or totes are removed from the system as discussed in further detail herein. Each in-feed processing station 24, 26, 28, 30, 34, 36, 38, 40 moves objects individually onto a circulating primary sortation system 42 that includes conveyor 70 on which is attached a plurality of cross-belt diverters 68 as further shown in FIG. 3. The cross-belt diverters 68 selectively direct objects to any of a plurality of downward directing conveyors 72, level directing conveyors 74 or upward directing conveyors 76. Each of the conveyors 72, 74, 76 provides a received object to a reciprocating diverter 90 that travels along a rail 78 to deliver an object to one of a plurality of totes 92. When a tote is completed (full or otherwise finished), the completed tote 94 is provided to tote output conveyors as discussed further herein. All of the operations are under the control of one or more processing systems 100.

Figure 3:
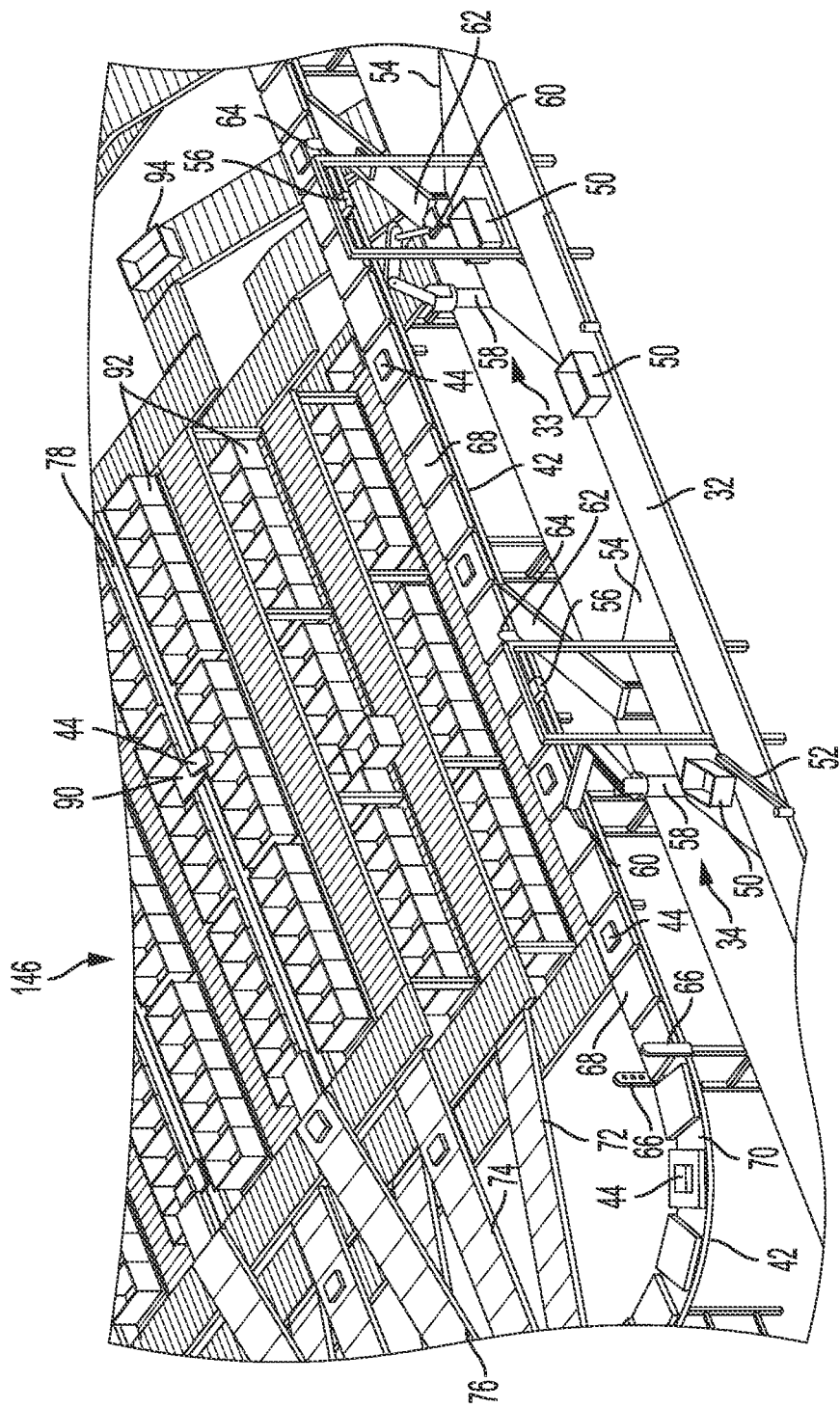
FIG. 3 shows an illustrative diagrammatic enlarged view of an infeed processing station of the system of FIG. 2.
Figure 4:
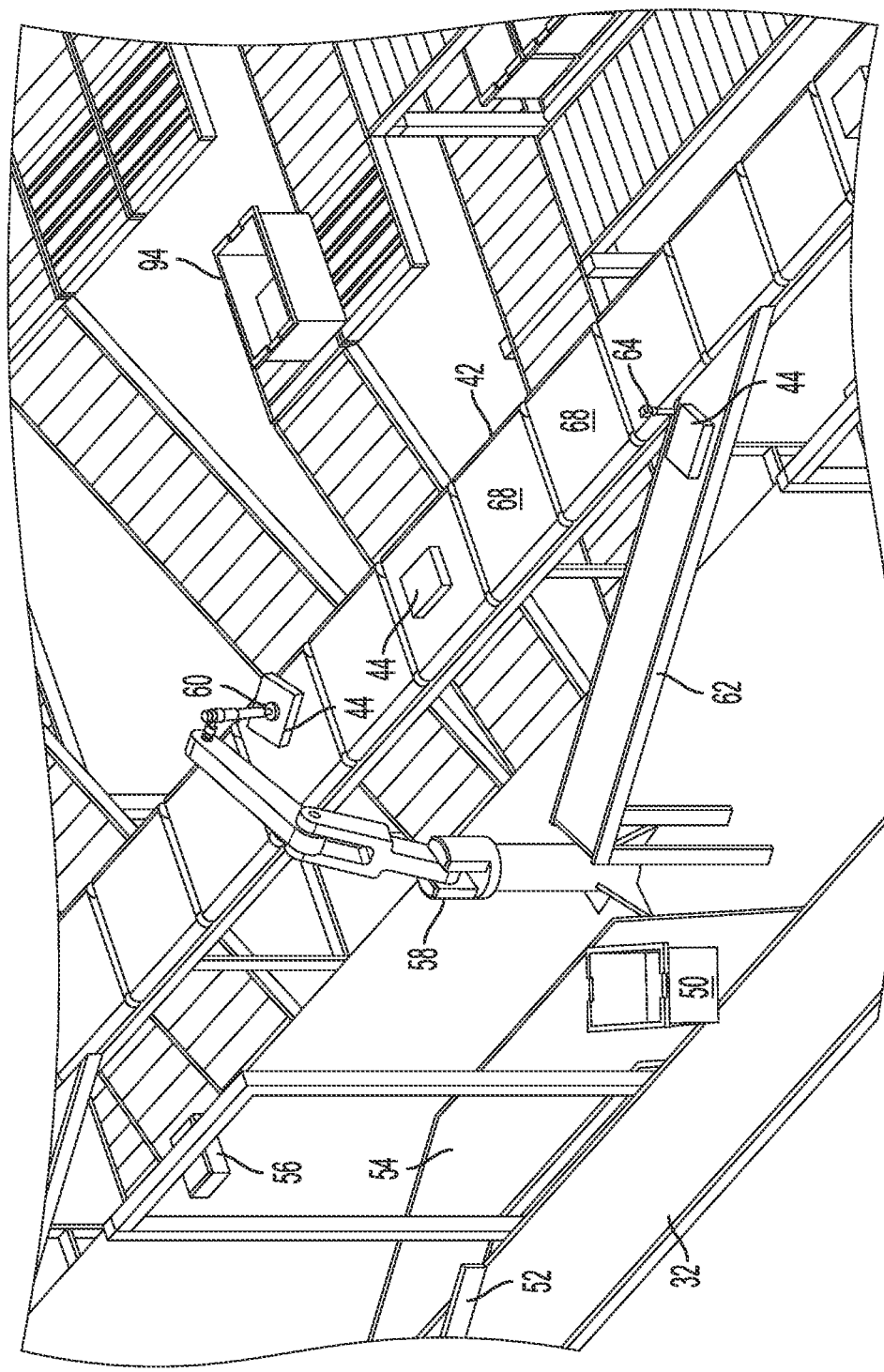
FIG. 4 shows an illustrative diagrammatic further enlarged view from an alternate angle of the infeed processing system of FIG. 3.

FIGS. 3 and 4 show that each in-feed processing station (e.g., 34, 36) includes a bin or tote diverter 52 that may be used to divert an input bin or tote 50 onto an in-feed processing station conveyor 54. A perception unit 56 may be used to identify objects in the bin or tote 50, and to direct a programmable motion device such as an articulated arm 58 having an end effector 60 to grasp and acquire the object 44 from the input bin or tote 50. In certain aspects, all objects in an input bin or tote 50 may be the same, and the identity may be determined by scanning a code or indicia on the bin or tote 50. The object 44 may then be placed onto an in-feed introduction conveyor 62 or may be placed directly onto a cross-belt diverter 68 of the circulating primary sortation system 42. Where the object is placed onto the in-feed introduction conveyor 62, the object 44 will move toward, and eventually join, the circulating primary sortation system 42, optionally under the monitor of a perception unit 64 such as a camera or sensor, to confirm the exact cross-belt diverter 68 onto which the object 44 is eventually positioned, and monitored during processing by one or more perception units 66 along the circulating primary sortation conveyor 70. The system therefore knows which object is on each loaded cross-belt diverter 68, and where each object is at all times during processing.

Induction onto the cross-belt sorter is therefore automated by a robot that is able to pick units out of totes filled with single SKUs or totes filled with multiple SKUs. For totes filled with a single SKU (homogeneous totes), the system scans the identification plate on the tote and is able to determine from the barcode what SKU it is and from there what order and therefore shuttle module it is destined for. For totes filled with multiple SKUs (heterogeneous totes), the system determines the identity of any one SKU by scanning the unit prior to placement on the cross-belt merge conveyor. This step therefore identifies the SKU and determines the shuttle module with the corresponding order.

Figure 5:
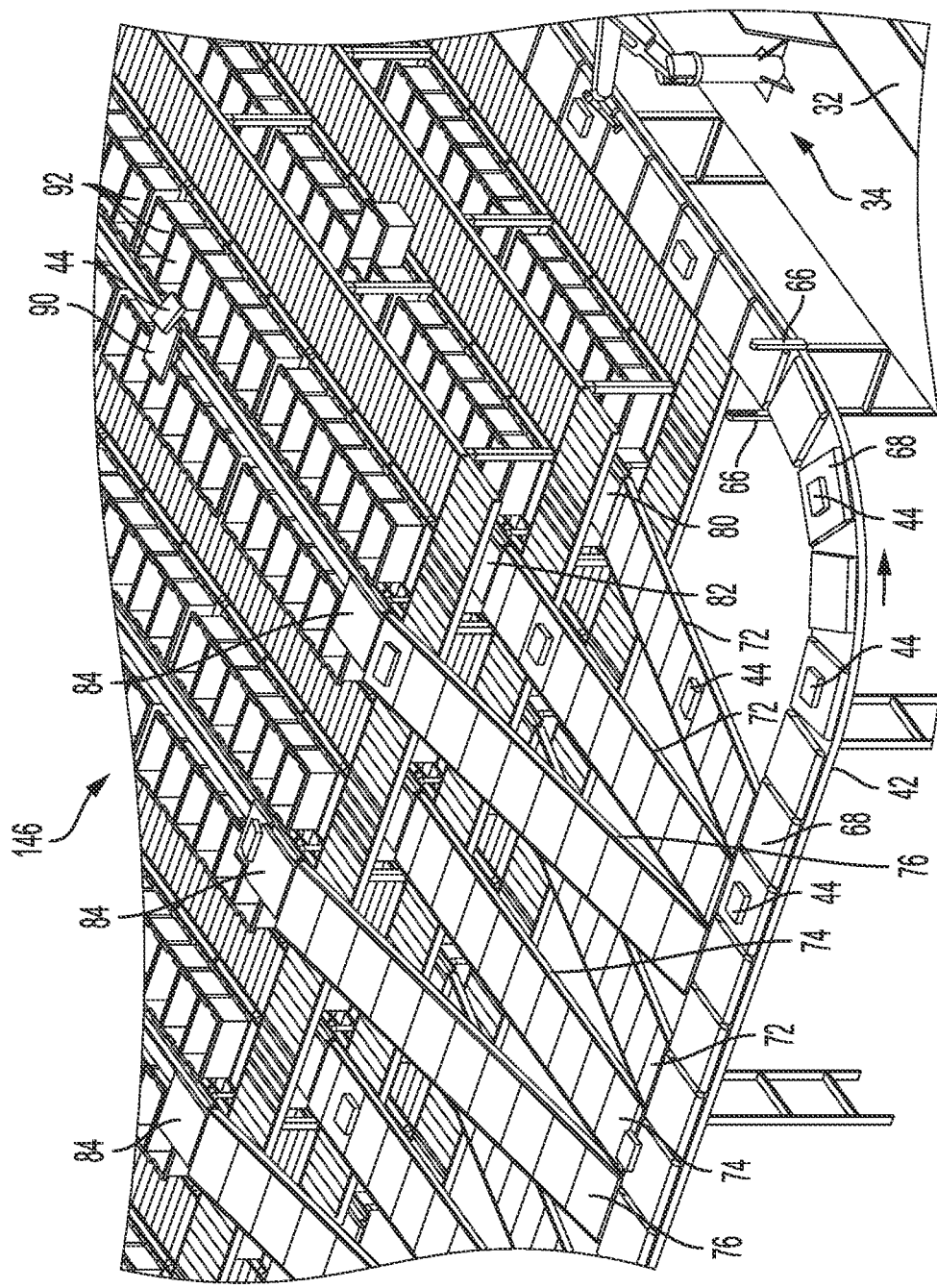
FIG. 5 shows an illustrative diagrammatic view of the primary sortation system of the system of FIG. 2.

As the cross-belt diverters 68 on the primary sortation conveyor 70 move, they travel past a plurality of conveyors that bring objects to any of a plurality of reciprocating secondary sortation systems. When a cross-belt diverter 68 is adjacent to a desired conveyor 72, 74, 76, the cross-belt diverter 68 is actuated to move the object thereon is in a direction orthogonal to the movement of the primary sortation conveyor 70. In particular, and with reference to FIG. 5, downward directing conveyors 72 bring objects to a lower level of reciprocating secondary sortation systems, level directing conveyors 74 bring objects to a central level of reciprocating secondary sortation systems, and upward directing conveyors 76 bring objects to an upper level of reciprocating secondary sortation systems. The downward directing conveyors 72 lead to a lower cache diverter 80, the level directing conveyors 74 lead to a middle cache diverter 82, and the upward directing conveyors lead to an upper cache diverter 84.

Figure 6:
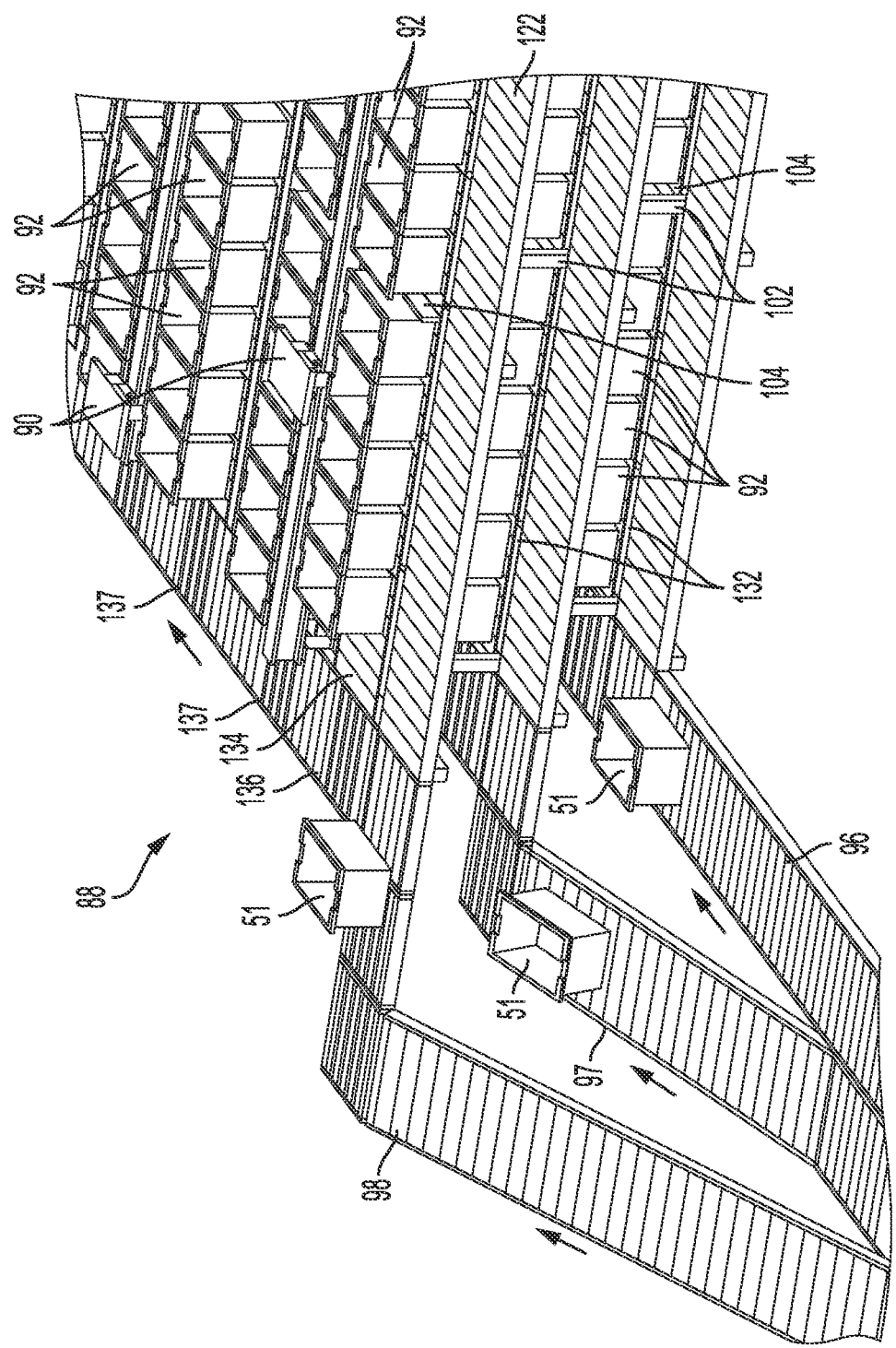
FIG. 6 shows an illustrative diagrammatic view of the secondary sortation system of the system of FIG. 2.
Figure 7:
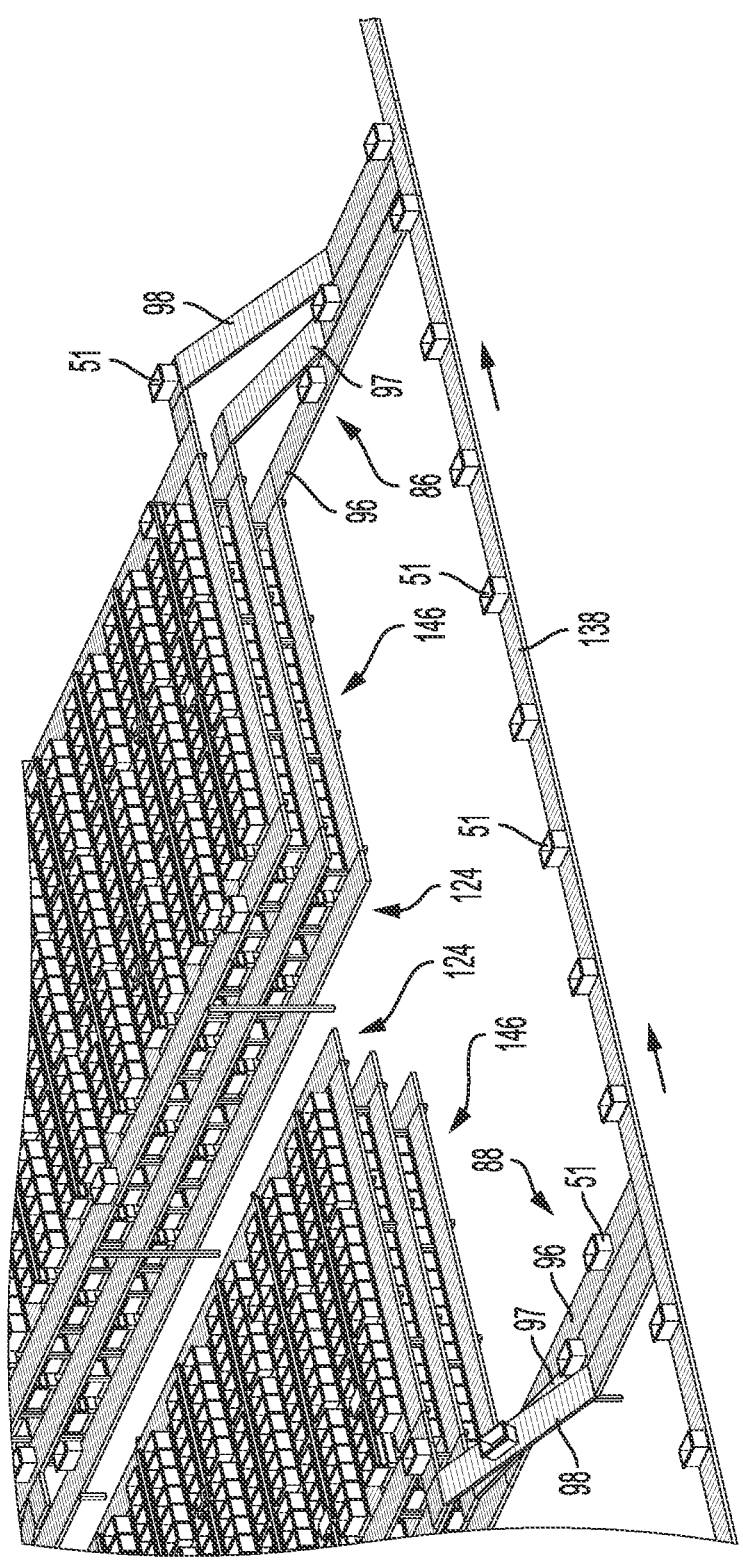
FIG. 7 shows an illustrative diagrammatic view of the output tote conveyance system of the system of FIG. 2.

As discussed in further detail below, each lower cache diverter 80, middle cache diverter 82 and upper cache diverter 84 may be activated to move an object thereon onto a reciprocating conveyor 90 when the reciprocating conveyor 90 is adjacent the cache diverter, and each reciprocating conveyor 90 may be moved to be adjacent a destination bin or tote 92, and then actuated to move an object 44 thereon into the adjacent bin or tote 92. With reference again to FIG. 2 and with further reference to FIG. 6, empty bins or totes 51 are introduced into the system from under the in-feed floor 46 at empty tote feed stations 86, 88. As shown in FIG. 6 (with the in-feed floor 46 and the conveyors 72, 74, 76 and diverters 80, 82, 84 removed for clarity), empty bins or totes 51 are provided to each of the lower middle and upper levels of the secondary sortation systems along lower empty tote in-feed conveyors 96, middle empty tote in-feed conveyors 97 and upper empty tote in-feed conveyors 98. As discussed in more detail below, completed bins or totes are removed from the tote queue conveyor 134 onto an adjacent tote output conveyor by, for example, a tote kicker (as discussed in more detail below), which action may be facilitated by rollers 132. FIG. 7 shows the empty tote feed stations 86, 88 with the in-feed floor 46 and in-feed conveyor 22 and in-feed processing stations 24, 26, 28, 30 removed for clarity, where the lower empty tote in-feed conveyors 96, middle empty tote in-feed conveyors 97 and upper empty tote-infeed conveyors 98 are fed by a common empty tote source conveyor 136 via multi-directional conveyors 137.

Once introduced into the secondary sortation systems 146, the position and location of each bin or tote 90 is known and monitored, so that objects may be purposefully deposited into desired bins or totes 90 in accordance with an order fulfillment manifest. Note also that support posts 102 are provided to support both the middle and upper levels, and to ensure that no bin or tote 90 is attempted to be removed into a support post 102, retractable barriers 104 are provided to maintain a required distance between bins or totes 90 to accommodate the support posts 102.

The shuttle module is the basic building block of the system and sorts units into totes corresponding to individual orders. The system delivers objects to totes, and manages the order totes—filling the system with empty totes, and discharging totes with fully filled orders. The shuttle module includes a linear shuttle, two tote queues, a tote kicker, and inbound and outbound conveyors. The linear shuttle travels parallel to the length of the module. The shuttle is driven, for example, by a linear slide; by a motor-driven wheel on rails; or other linear motion device. The shuttle carries a unit conveyor such as a tilt-tray or cross-belt device. The unit conveyor receives units, and in combination with the linear action of the shuttle, is able to deliver those units to totes in a left or right tote queue. The two tote queues are on either side of the shuttle. The tote queues are a line of a variable number of totes resting on motor driven conveyor. The tote queue consists of multiple zones of accumulated totes.

Figure 8:
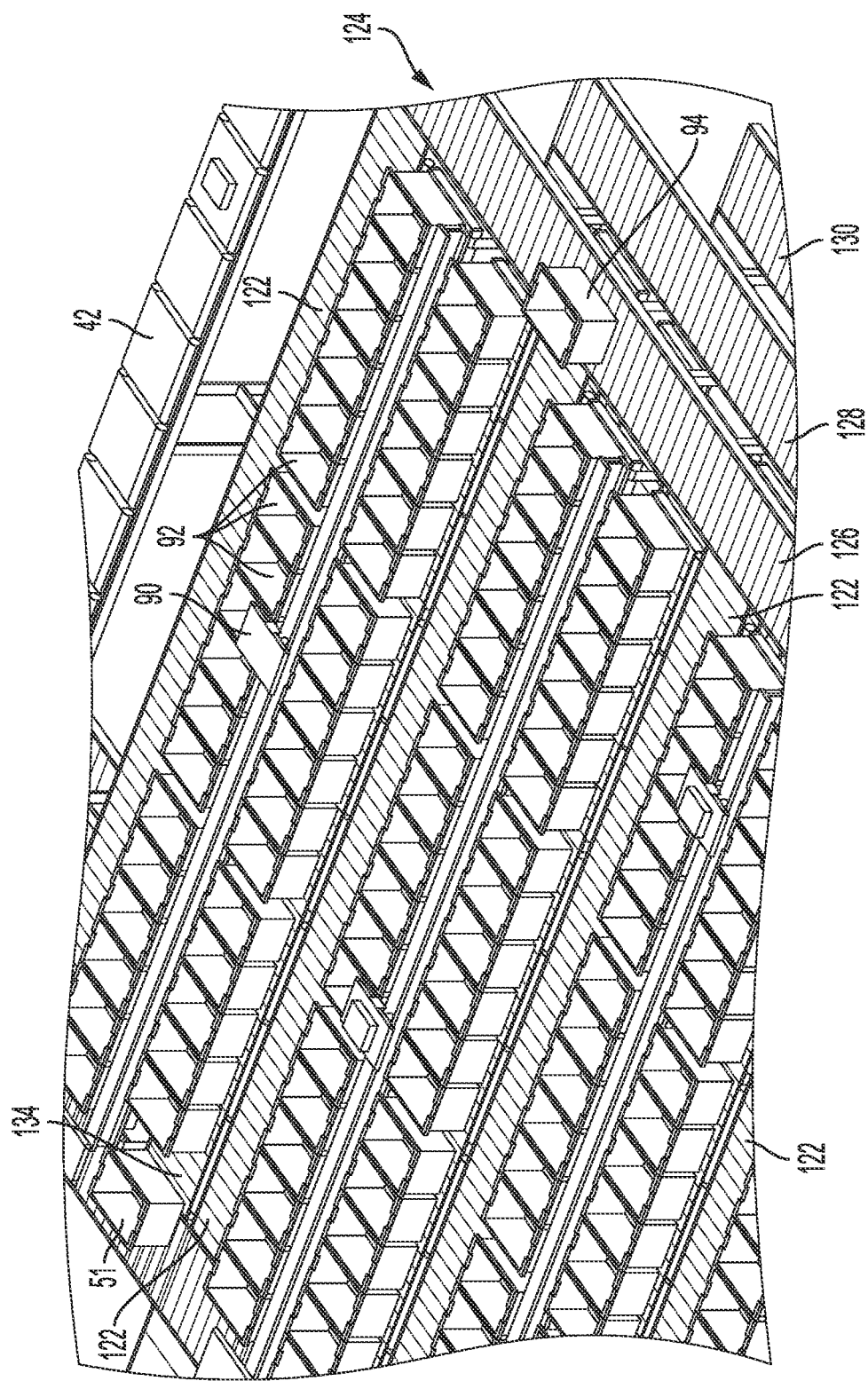
FIG. 8 shows an illustrative diagrammatic enlarged view of the tote removal portion of the output tote conveyance system of FIG. 7 from an alternate angle.
Figure 9:
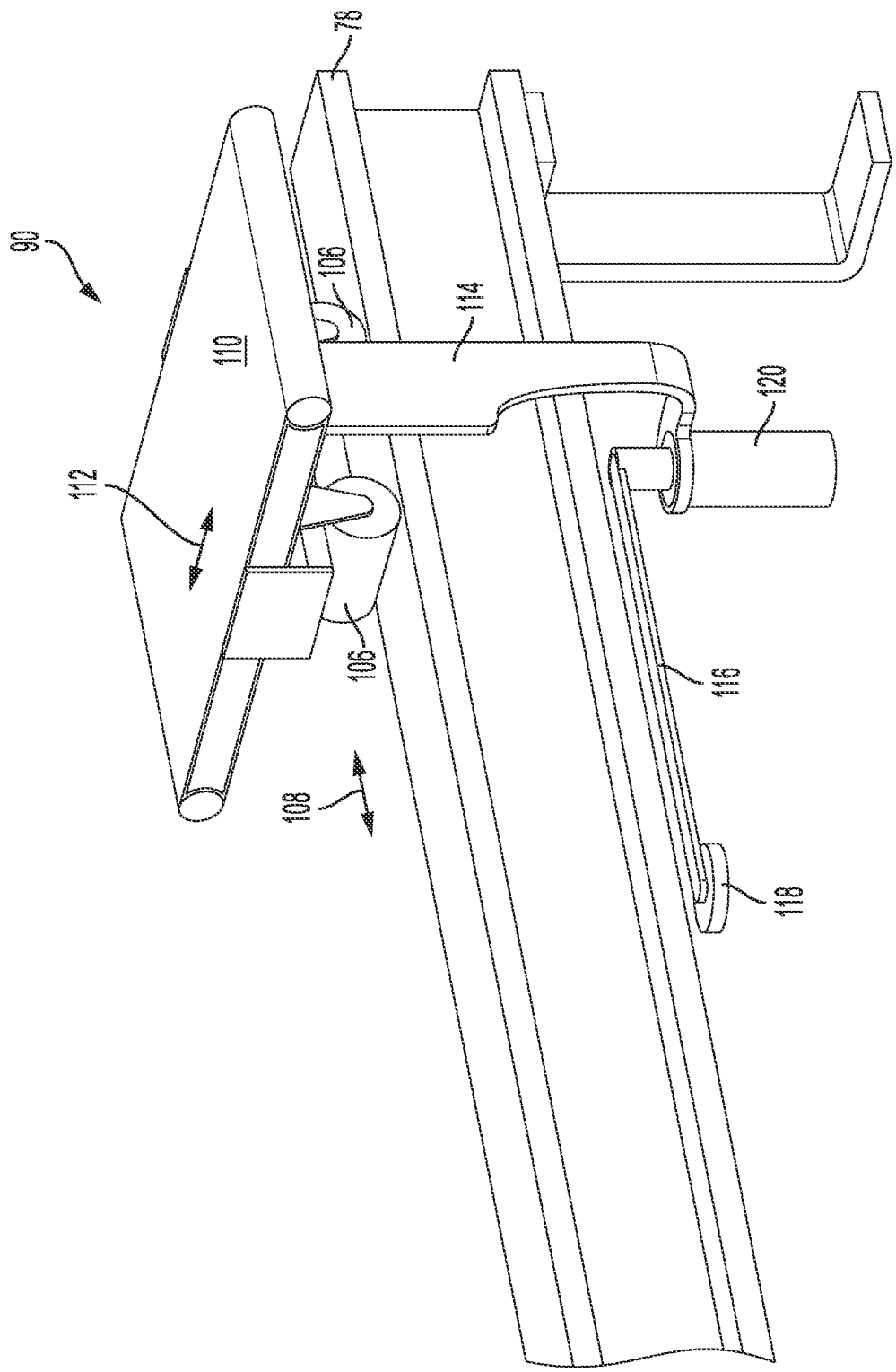
FIG. 9 shows an illustrative diagrammatic view of a tote kicker system for use in a system of FIG. 2.

The totes 92 may be either gravity biased or driven to push toward a central region of the circulating primary sortation system (allowing for the support posts as noted above). With reference to FIG. 8, empty bins or totes 51 are introduced into the queues (again, noting the location of each individual bin or tote), and the reciprocating conveyors 90 are actuatable to move between the queues and to deliver an object thereon into a desired bin or tote 92. FIG. 9 shows the reciprocating conveyor 90 on the rail 78. The reciprocating conveyor 90 may be controlled by pneumatics or electric motors, and may, for example, ride along the rail 78 by rollers 106. As shown at 108, the reciprocating conveyor 90 may travel along the rail 78, and a conveyor belt 110 on the reciprocating conveyor may be actuatable to drive in directions orthogonal to the direction 108 as shown at 112.

Figure 10:
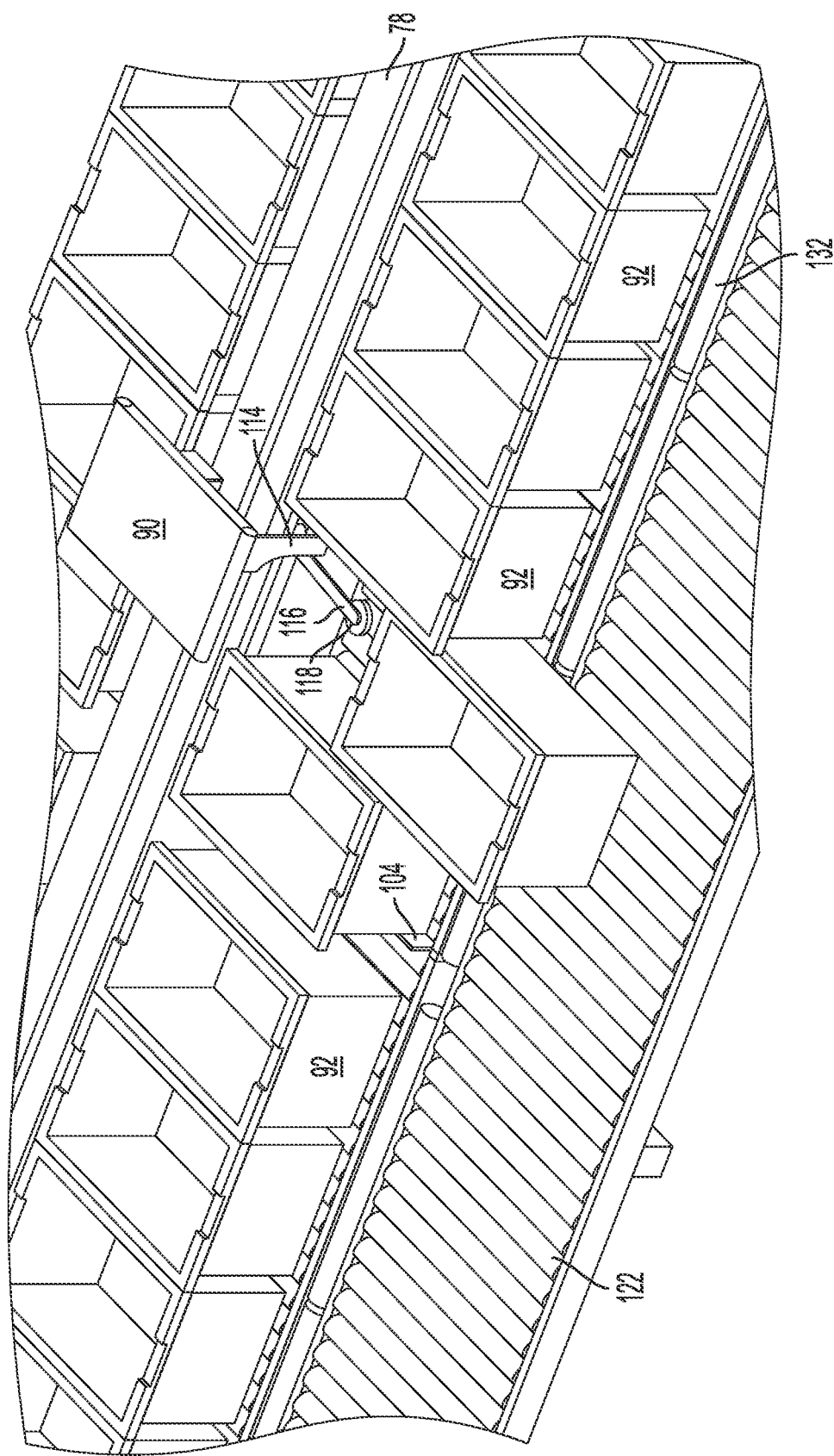
FIG. 10 shows an illustrative diagrammatic view of the tote kicker of FIG. 9 moving a tote from the secondary sortation system to the output tote conveyance system.

As also shown in FIG. 9, the reciprocating conveyor 90 also includes an attached tote kicker assembly 114 including a kicker arm 116 with a roller 118 at an end thereof, as well as a motor actuator 120 for rotating the kicker arm 116 in either direction away from the rail 78. With reference again to FIG. 8 and with further reference to FIG. 10, the tote kicker assemblies 114 are used to move a selected bin or tote 92 that is full or otherwise complete, out of the queue and onto an adjacent tote output conveyor 122. Such selected bins or totes are then moved along the tote output conveyor 122 (away from the empty tote feed stations) toward a completed tote removal station 124, which includes an upper level removal conveyor 126, a middle level removal conveyor 128 and a lower level removal conveyor 130.

As noted above, breaks in between runs of accumulated totes, held by retractable barriers 104, allow space for structural elements to hold up the shuttle. Thus when totes are kicked, they do not hit structural supports. The shuttle also carries a tote kicker, which is able to push totes out of the tote queue onto an outbound conveyor. The tote kicker is on a single arm, or double-action arm that extends a wheel out to push the tote to the outbound conveyor. The outbound conveyor conveys filled order totes away from the module. It receives totes from the tote queue by the action of the tote kicker. The outbound conveyor feeds an outbound trunk conveyor line. The inbound conveyor supplies empty order totes to the module, by diverting empty totes into the tote queue.

In particular, and with reference to FIGS. 11A-11D, the tote kicker begins (FIG. 11A) by moving the reciprocating conveyor 90 to be adjacent a tote 92 to be removed. The kicker arm 116 then rotates, and when the roller 118 contacts the tote 92, the tote 92 begins to move (FIG. 11B) toward the output conveyor 122. As the kicker arm 116 continues to rotate, the roller 118 pushes the tote 92 further (FIG. 11C) until the tote 92 is positioned on the output conveyor 122, whereupon the kicker arm 116 returns to a neutral position (FIG. 11D). The system may also include a removal roller 134 (either active or passive) that facilitates the transfer of a tote 92 from a tote queue conveyor 134 to the output conveyor 122.

The tote kicker may be designed to accommodate the conveyor, with a kicker mechanism underneath the supporting I-beam that is attached by a C-shaped bracket. The I-beam itself is held by a (reversed) C-shaped bracket. This design (1) physically supports the shuttle; (2) allows the shuttle to freely travel the entire length of the shuttle module without interference; and (3) because the I-beam supporting C-brackets are spread out, it allows the kicker to kick totes on either side of the shuttle. The length of the shuttle module may be configured as needed, and the number of totes in the queue may vary between designs.

Shuttle modules are stacked together to make up a shuttle wall using the following design principles. Vertical space is exploited to reduce the footprint. The system increases the number of destinations per square foot by stacking shuttle modules and using vertical space. Each shuttle module is designed so that structural supports can hold up a layer above it. Multiple layers can be made, 2 to 4 layers, where the height limited by the ability to feed the shuttles.

The number of conveyors is reduced by having two side-by-side shuttle modules share a single outbound conveyor. For example, five (5) side-by-side shuttle modules would have a total of six (6) outbound conveyors. The levels of the shuttle modules levels are staggered so that shuttle positions are spread out evenly over the length of the wall (as opposed to all lying in the same vertical column). Then chutes off of a unit sorter, such as a cross-belt sorter, can feed each shuttle module via sloped belted conveyors, shown next page.

The inbound empty order tote conveyor and outbound filled order tote trunk conveyor of side-by-side shuttle modules are joined. Common conveyors of empty totes feed all shuttle modules, and outbound trunk conveyors carry discharged and filled order totes to packing stations.

The automated order sortation system uses the shuttle wall as the secondary sort in a cascaded sort. A cross-belt sorter does a primary sort of the units, where each chute of the cross-belt sorter leads to one shuttle module. The cross-belt sorter delivers a unit to the shuttle module holding the unit's corresponding order tote. The chute of the cross-belt sorter is a belted conveyor that conveys the sorted unit to the shuttle module's shuttle. Because the shuttle modules are staggered, there is an efficient use of the length of the cross-belt sorter, and use of vertical space for the wall. If the levels of the shuttle wall are A for bottom, B for middle, and C for top; and if destinations are numbered starting from 1; then, assignments from destinations to levels exploit the staggering, so that 1=>A, 2=>B, 3=>C, 4=>A, 5=>B, 6=>C, 7=>A etc.

Figure 12:
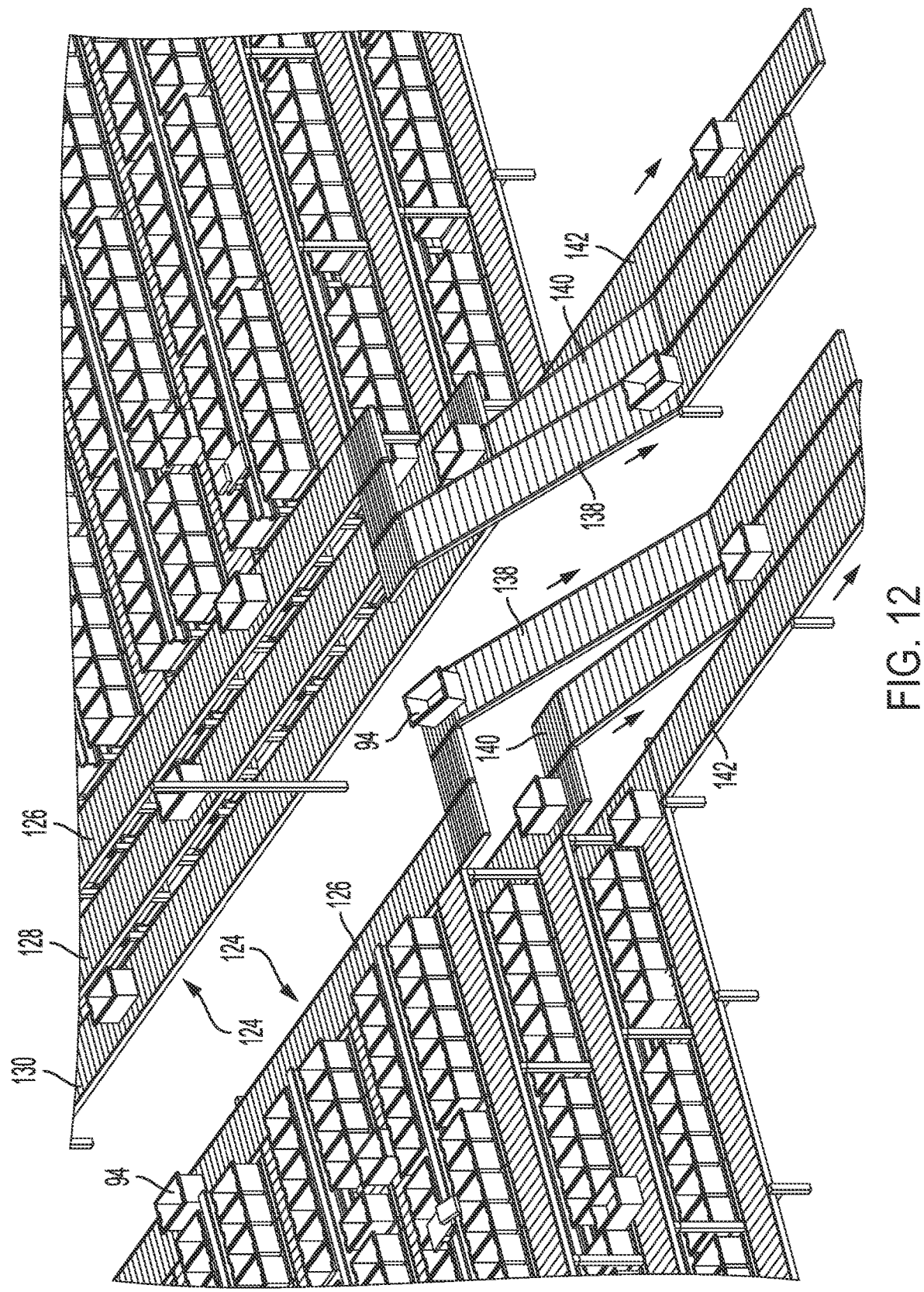
FIG. 12 shows an illustrative diagrammatic view of the tote transport portion of the output conveyance system of the system of FIG. 2.
Figure 13:
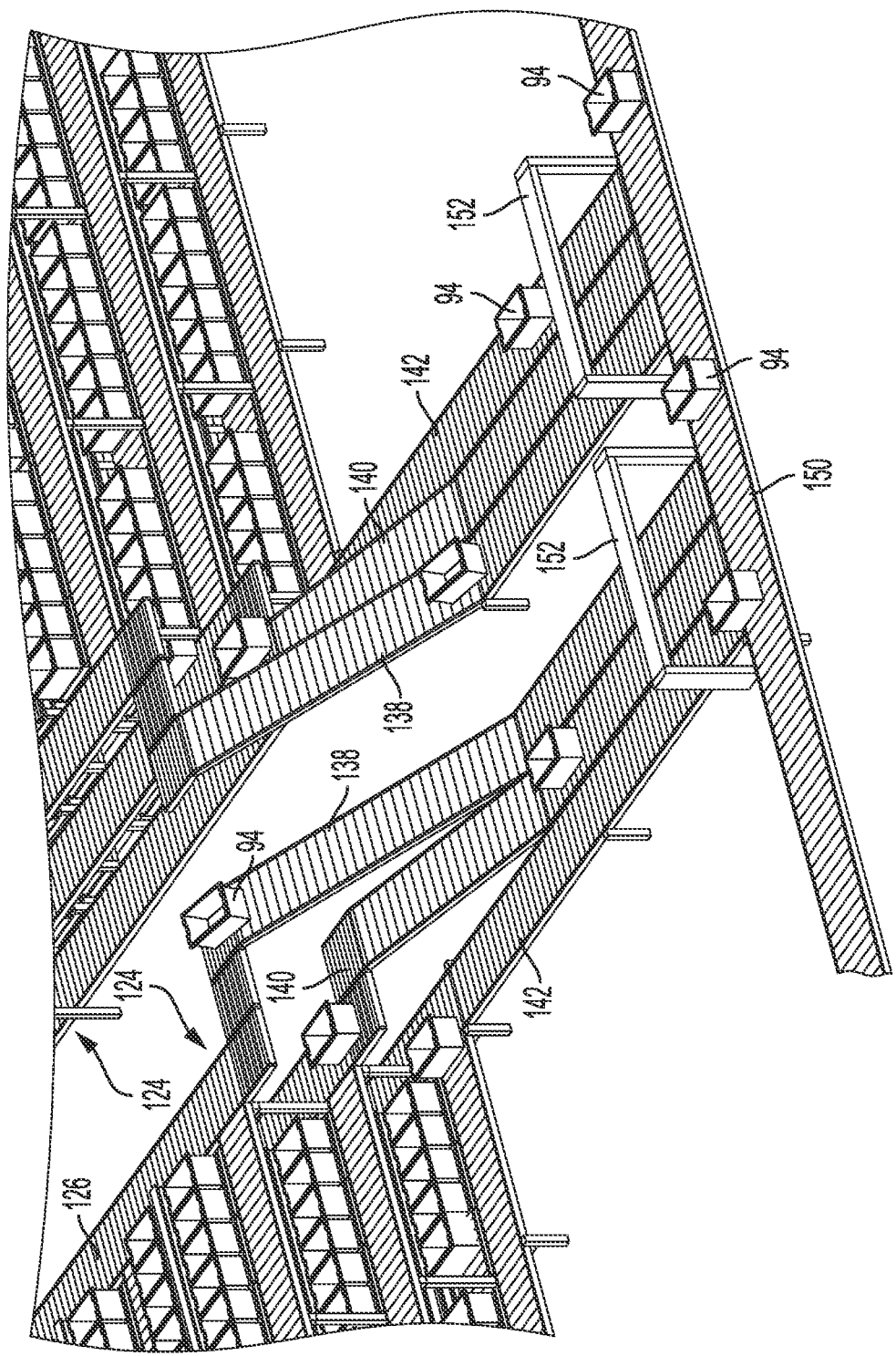
FIG. 13 shows an illustrative diagrammatic enlarged view of the tote transport portion of FIG. 12 showing tote scanners.

With reference to FIG. 12, the completed tote removal systems 124 may include upper, middle and lower level removal conveyors 126, 128, 130 as discussed above that lead to individual output conveyors 138, 140, 142. Such individual output conveyors 138, 140, 142 may be directed to desired destination areas. In accordance with further aspects, and with reference to FIG. 13, the individual output conveyors 138, 140, 142 may lead to a common order fulfillment conveyor 150, and may further include additional final perception systems 152 to confirm the placement and contents of the completed totes 94.

Figure 14:
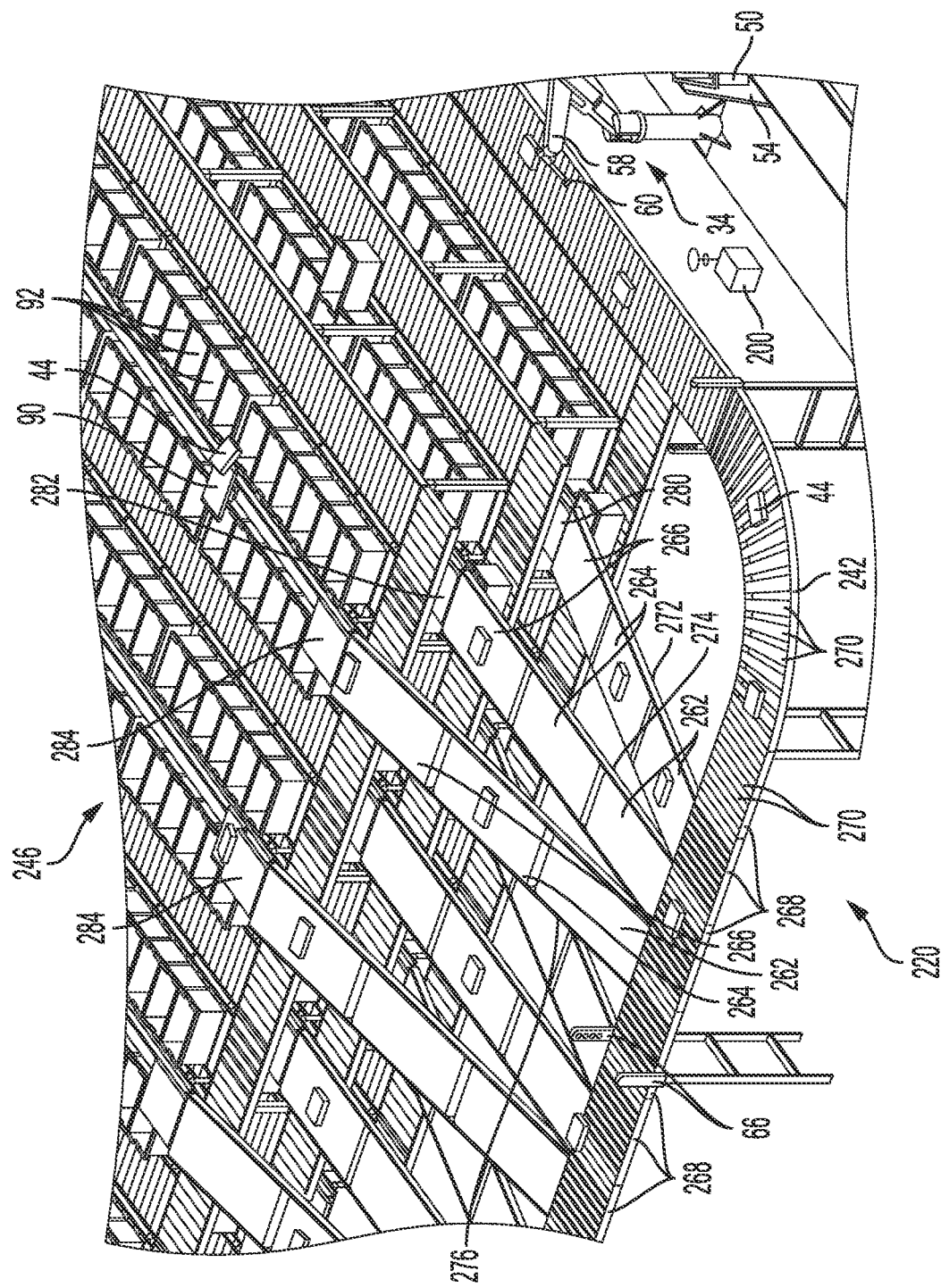
FIG. 14 shows an illustrative diagrammatic view of a primary transport system for use in an order fulfillment system in accordance with another aspect of the invention.

With reference to FIG. 14 (showing a view similar to that of FIG. 5), a processing system 220 in accordance with a further aspect of the invention may include a circulating primary sortation system 242 that includes rollers 270, as well as bi-directional diverters 268 for diverting objects onto one of a plurality of belted metering conveyors 272, 274, 276. The belted metering conveyors may include belt sections 262, 264, 266 (as further shown in FIG. 18) that may be independently actuated to permit objects to be buffered on the conveyors 272, 274, 276, for example, to maintain singulation of objects while awaiting return of an associated reciprocating conveyor 290.

Many of the other elements of the system may be as disclosed above with reference to the system of FIGS. 2-13. For example, the system 220 may include a pair of object in-feed conveyors along which in-feed processing stations (e.g., 34) are provided. The object in-feed conveyors provide input bins or totes in which objects are provided to the system. The object in-feed conveyors and in-feed processing stations are provided on in-feed floors below which empty bins or totes are provided to the system and completed bins or totes are removed from the system as discussed in further detail herein. Each in-feed processing station (e.g., 34) moves objects individually onto the circulating primary sortation system 242. The bi-directional diverters 268 selectively direct objects to any of the plurality of downward directing belted metering conveyor 272, level directing belted metering conveyor 274 or upward directing belted metering conveyor 276 as discussed above with reference to the system of FIG. 5.

Each of the conveyors 272, 274, 276 provides a buffered received object to a lower cache diverter 280, a level cache diverter 282 or an upper cache diverter 284, which feeds a reciprocating diverter 90 that travels along a rail to deliver an object to one of a plurality of totes 92. When a tote is completed (full or otherwise finished), the completed tote is provided to tote output conveyors as discussed above. All of the operations are under the control of one or more processing systems 200.

As discussed above, each in-feed processing station (e.g., 34) includes a bin or tote diverter that may be used to divert an input bin or tote onto an in-feed processing station conveyor 54. One or more perception units may be used to identify objects in the bin or tote, and to direct a programmable motion device such as an articulated arm 58 having an end effector 60 to grasp and acquire the object from the input bin or tote. Again, in certain aspects, all objects in an input bin or tote may be the same, and the identity may be determined by scanning a code or indicia on the bin or tote. The object may then be placed onto an in-feed introduction conveyor or may be placed directly onto the circulating primary sortation system 242. In accordance with various aspects, the system maintains knowledge of the order of objects on the conveyor, and monitors each object as it travels along the conveyor 242 using a plurality of sensors 66.

Again, induction is therefore automated by a robot that is able to pick units out of totes filled with single SKUs or totes filled with multiple SKUs. For totes filled with a single SKU (homogeneous totes), the system scans the identification plate on the tote and is able to determine from the barcode what SKU it is and from there what order and therefore shuttle module it is destined for. For totes filled with multiple SKUs (heterogeneous totes), the system determines the identity of any one SKU by scanning the unit prior to placement on the cross-belt merge conveyor. This step therefore identifies the SKU and determines the shuttle module with the corresponding order.

Figure 15A:
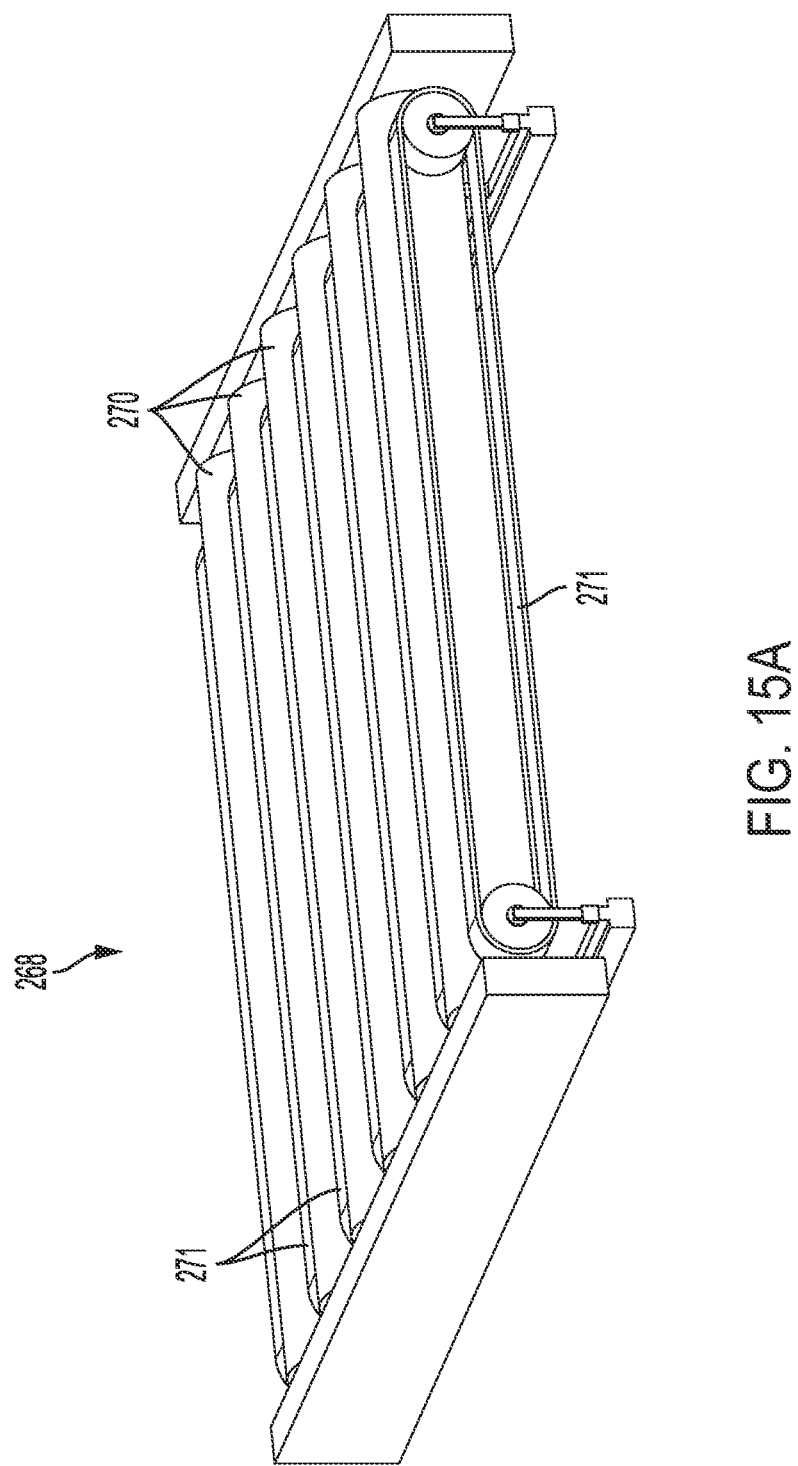
FIGS. 15A and 15B show illustrative diagrammatic views of a multi-directional diverter for use in an order fulfillment system in accordance with an aspect of the invention with diverter belts not engaged (FIG. 15A) and engaged (FIG. 15B)
Figure 15B:
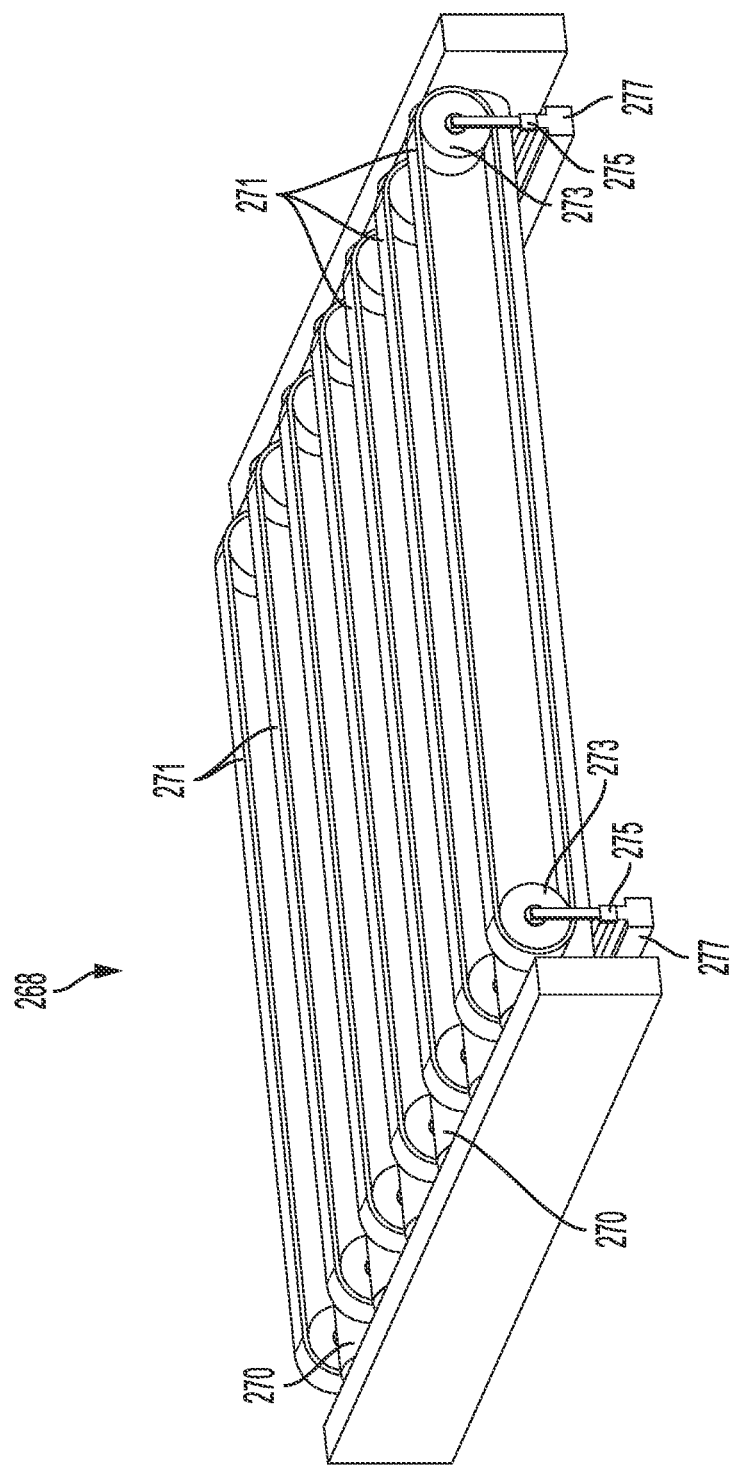
Figure 16:
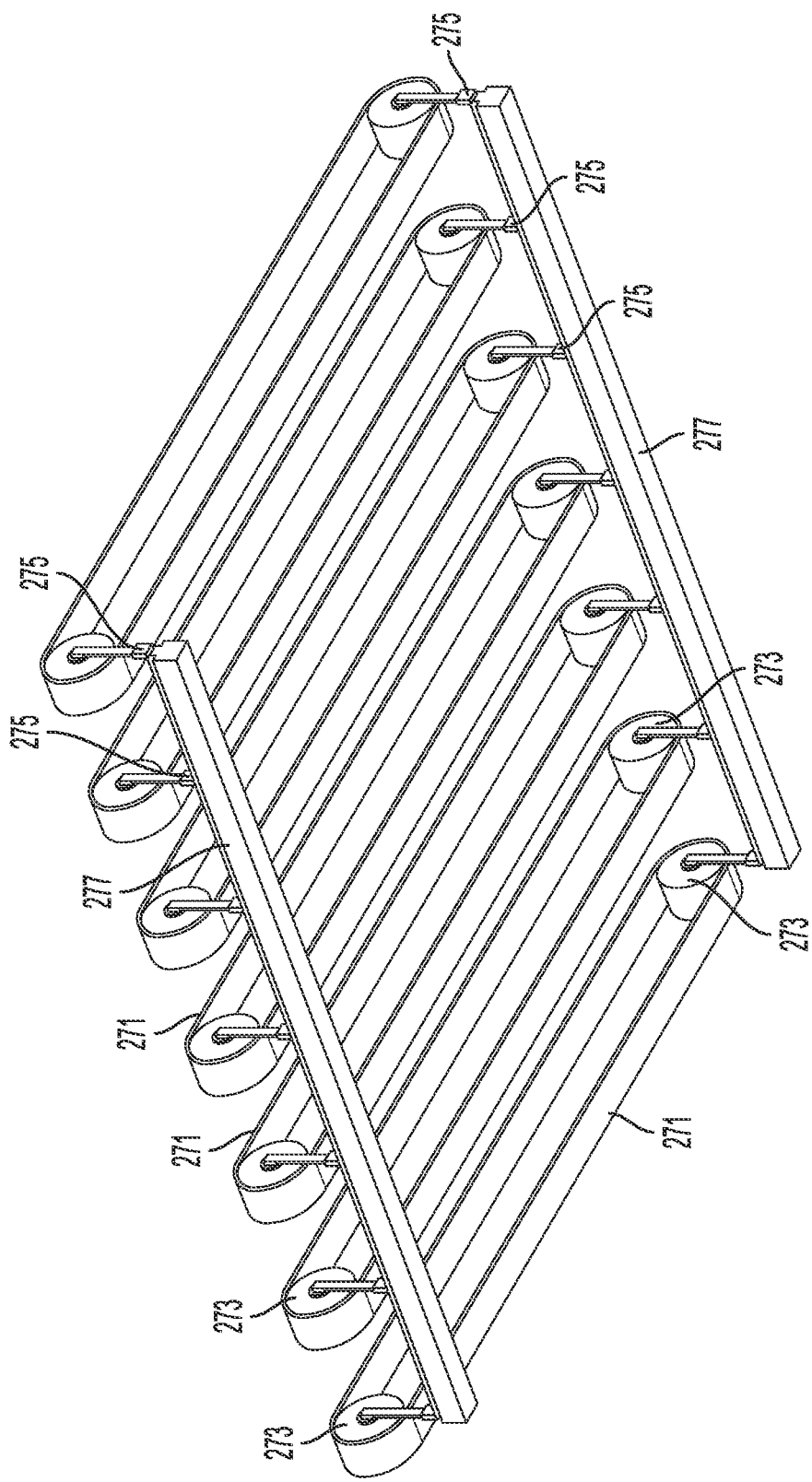
FIG. 16 shows an illustrative diagrammatic underside view of the belt diverter portion of the multi-directional diverter of FIGS. 15A and 15B.

With reference to FIG. 15A, each bi-directional diverter 268 includes active rollers 270 as well as bi-directional diverters 268 that include a cross direction assembly of belts 271. As shown in FIG. 15B, the cross direction assembly of belts 271 may be raised with respect to the rollers 270, and when raised will engage an object thereon, lifting the object off of the rollers 270. The belts 271 may then be activated to move the object in a direction that is orthogonal to the direction of movement of the rollers 270. With further reference to FIG. 16, each belt 271 is driven by one or more pulley wheels 273, and each pulley wheel 273 is mounted to a cross direction assembly rail 277 via a force torque sensor 275. The force torque sensors 275 are able to collectively measure the weight of an object on the belts by summing the detected weights among the sensors 275. In this way, when an object is stopped at the bi-directional diverter 268, the system may determine the weight of the object to thereby further confirm that weight matches or sufficiently matches the expected weight knowing the identity of the object as also confirmed by the sensors 66.

Again, and with reference to FIG. 14, downward directing conveyors 272 bring objects to a lower level of reciprocating secondary sortation systems, level directing conveyors 274 bring objects to a central level of reciprocating secondary sortation systems, and upward directing conveyors 276 bring objects to an upper level of reciprocating secondary sortation systems. The downward directing conveyors 272 lead to a lower cache diverter 280, the level directing conveyors 274 lead to a middle cache diverter 282, and the upward directing conveyors lead to an upper cache diverter 284.

Figure 17:
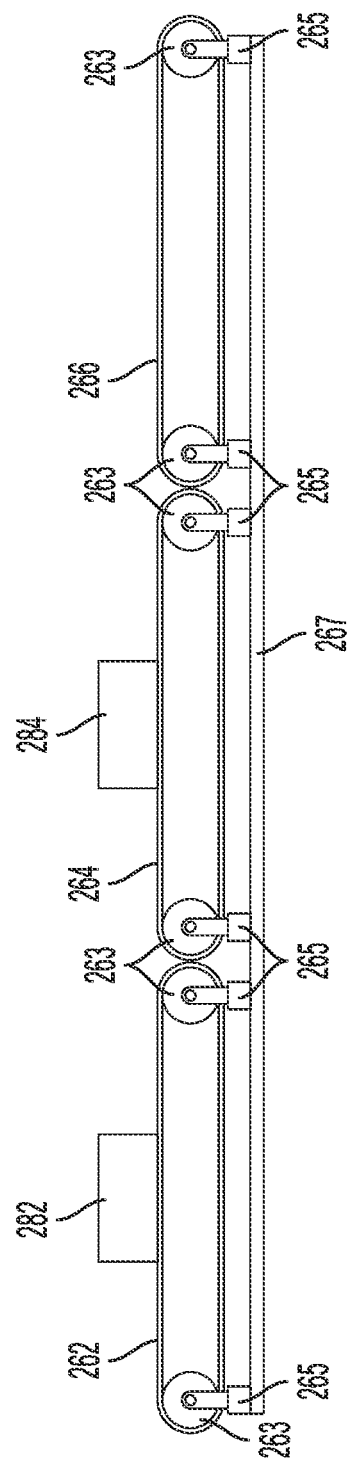
FIG. 17 shows an illustrative diagrammatic view of a series of sequencing conveyors in the primary sortation system of FIG. 14.

Similarly, each lower cache diverter 280, middle cache diverter 282 and upper cache diverter 284 may be activated (using the buffered movement discussed herein) to move an object thereon onto a reciprocating conveyor 90 when the reciprocating conveyor 90 is adjacent the cache diverter. With reference to FIG. 17, each of the belted metering conveyors 272, 274, 276 includes multiple independent belt sections (e.g., 262, 264, 266), and as shown, each belt section may be provided on two pairs of pulley wheels 263 (at least two of which are powered), and each pulley wheel may be provided on a force torque sensor 265 that is attached to a frame 267. The force torque sensors 265 are used to determine weight, e.g., whether an object is currently on the respective conveyor, and this information is used by the system to know when to advance an object from one conveyor to the next adjacent conveyor (only when empty).

In this way, the belted metering conveyors may provide buffering of objects as each object will be held on a belt section 262, 264, 266 until the next adjacent belt section (or cache diverter) is empty. Object 282 therefore on belt section 262 will not be moved to belt section 264 until the object 284 on belt section 264 is empty (object 284 has been moved to belt section 266). The cache diverters may include similar force torque sensing mountings, and may be engaged to move an object at a time to a reciprocating conveyor 90. Each reciprocating conveyor 90 may then be moved to be adjacent a destination bin or tote 92, and then actuated to move an object 44 thereon into the adjacent bin or tote 92.

As discussed above with regard to the systems of FIGS. 2-13, empty bins or totes are introduced into the system from under the in-feed floor at empty tote feed stations, and empty bins or totes are provided to each of the lower middle and upper levels of the secondary sortation systems along lower empty tote in-feed conveyors, middle empty tote in-feed conveyors and upper empty tote in-feed conveyors as discussed above. Again, once introduced in the secondary sortation systems 246, the position and location of each bin or tote 90 is known and monitored, so that objects may be purposefully deposited into desired bins or totes 90 in accordance with an order fulfillment manifest.

Figure 18:
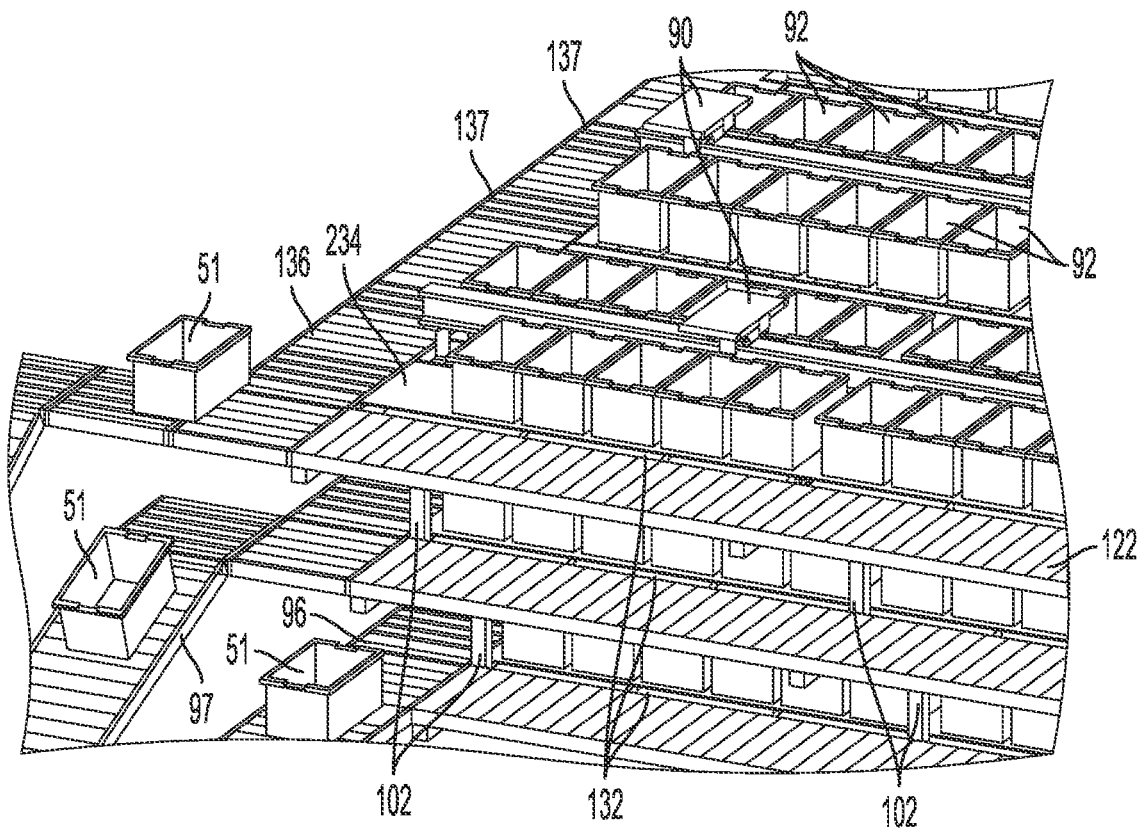
FIG. 18 shows an illustrative diagrammatic view of a secondary sortation system for use in an order fulfillment system in accordance with another aspect of the invention.

Again, support posts are provided to support both the middle and upper levels. In accordance with an aspect, and as shown in FIG. 18, to ensure that no bin or tote 90 is attempted to be removed into a support post the bins or totes 92 may be provided on a series of weight-sensing belted conveyors 234 (similar to weight sensing belted conveyors 262, 264, 266), and each belt section may match the opening between posts 102. The bins would therefore advance away from the empty tote source conveyor 136 in sets of bins or totes (e.g., in sets of six bins or totes) when the next adjacent belt section was determined (by weight) to be empty. Because the belt sections match the spacing of the posts 102, a bin or tote would not be attempted to be removed into a post 102.

Again, the system delivers objects to totes, and manages the order totes—filling the system with empty totes, and discharging totes with fully filled orders. The shuttle module includes a linear shuttle, two tote queues, a tote kicker, and inbound and outbound conveyors. The linear shuttle travels parallel to the length of the module. The shuttle is driven as discussed above, and carries a unit conveyor such as a tilt-tray or cross-belt device. The unit conveyor receives units, and in combination with the linear action of the shuttle, is able to deliver those units to totes in a left or right tote queue. The two tote queues are on either side of the shuttle, and provide a line of a variable number of totes resting on motor driven conveyor.

Similar to the system of FIG. 8, empty bins or totes are introduced into the queues (again, noting the location of each individual bin or tote), and the reciprocating conveyors 90 are actuatable to move between the queues and to deliver an object thereon into a desired bin or tote 92. The reciprocating conveyor 90 may be controlled as discussed above by pneumatics or electric motors to move in directions orthogonal to the direction 108 as shown at 112.

Again, the reciprocating conveyor 90 also includes an attached tote kicker assembly including a kicker arm 116 as discussed above with reference to FIG. 9, that is used to move a selected bin or tote that is full or otherwise complete, out of the queue and onto the adjacent tote output conveyor 122. Such selected bins or totes are then moved along the tote output conveyor 122 (away from the empty tote feed stations) toward a completed tote removal station, which includes an upper level removal conveyor, a middle level removal conveyor and a lower level removal conveyor.

Again, the completed tote removal systems may include upper, middle and lower level removal conveyors as discussed above that lead to individual output conveyors. Such individual output conveyors may be directed to desired destination areas, or may lead to a common order fulfillment conveyor, and may further include additional final perception systems to confirm the placement and contents of the completed totes.

The entire automated order sortation system with induction stations, cross-belt sorter, and two sort walls provides the automated sortation of large orders into a large number of totes. The discharged and filled order totes leave the system on the outbound order tote trunk conveyors. These outbound conveyors are shown in the middle axis of the preceding figure. They take the filled order totes to packing stations, where orders are packed into boxes and sent to shipping.

With reference to FIG. 19, in accordance with further aspects of the present invention, two or more systems 320 may be provided as discussed above that access common in-feed conveyors 322, 332, each of which includes circulating primary sortation systems 342 as well as secondary sortation systems 346 that are generally within the circulating primary sortation systems 342 as discussed above that lead to completed tote removal stations 324 as discussed above. In this manner, many processing systems 320 may be provided along common infeed conveyors, providing, for example, that many different types of objects may be processed at the same time, and further, optionally providing that certain processing stations be directed objects that are well suited (e.g., due to size or weight) for processing by certain processing stations.

Those skilled in the art will appreciate that numerous modifications and variations may be made to the above disclosed embodiments without departing from the spirit and scope of the present invention.

What is claimed is:

1. An order fulfillment system in which objects to be collected into orders are provided in output totes, said system comprising:
   a primary sortation system that includes a loop conveyance system that moves objects around a closed loop that includes a plurality of primary sortation exits, each of which leads to a secondary sortation system inside the closed loop,
   wherein the secondary sortation system includes a plurality of layered shuttle modules, each shuttle module further including a linear shuttle that travels along a rail to receive an object from one of the plurality of primary sortation exits of the primary sortation system and conveys the object to one of a plurality of totes provided on each of opposing sides of the rail using a reciprocating conveyor of the linear shuttle, said plurality of layered shuttle modules being vertically stacked within the closed loop of the primary sortation system.

2. The order fulfillment system as claimed in claim 1, wherein said primary sortation system receives objects from a plurality of infeed stations.

3. The order fulfillment system as claimed in claim 1, wherein said loop conveyance system includes a cross-belt conveyor.

4. The order fulfillment system as claimed in claim 1, wherein said loop conveyance system includes a plurality of powered rollers.

5. The order fulfillment system as claimed in claim 1, wherein said loop conveyance system includes a plurality of weighing stations.

6. The order fulfillment system as claimed in claim 1, wherein the linear shuttle travels between two rows of said plurality of totes.

7. The order fulfillment system as claimed in claim 1, wherein each of the plurality of primary sortation exits divert objects onto one of a plurality of belted conveyors that leads to one of the plurality of layered shuttle modules of the secondary sortation system, wherein the plurality of belted conveyors include independently controllable sections.

8. The order fulfillment system as claimed in claim 7, wherein the independently controllable sections includes weighing sensors.

9. The order fulfillment system as claimed in claim 1, wherein the plurality of layered shuttle modules of the secondary sortation system includes three vertical levels of shuttle modules.

10. The order fulfillment system as claimed in claim 1, wherein the order fulfillment system further includes an output tote conveyance system that is located along directions that run through a central region of the closed loop.

11. An order fulfillment system in which objects to be collected into orders are provided in output totes, said system comprising:
- an input conveyance system that moves objects toward a loop conveyance system generally along a first input direction;
- a primary sortation system that includes the loop conveyance system that moves objects around a closed loop that includes a plurality of primary sortation exits, each of which leads to a secondary sortation system inside the closed loop;
- wherein the secondary sortation system includes a plurality of shuttle modules, each shuttle module further including a linear shuttle that travels along a rail to receive an object from one of the plurality of primary sortation exits of the primary sortation system and conveys objects to one of a plurality of totes provided on either side of the rail; and
- the system further comprising an output tote conveyance system for moving completed totes within the closed loop in a direction that is generally transverse to the input direction,
- wherein the linear shuttle includes a reciprocating belt conveyor for conveying objects to a tote on either side of the linear shuttle, and a tote kicker assembly that comprises a kicker arm and a roller at an end of the kicker arm, wherein the kicker arm is rotated in a direction away from the rail to push a selected tote among the plurality of totes onto the output tote conveyance system.

12. The order fulfillment system as claimed in claim 11, wherein said input conveyance system includes a plurality of infeed stations.

13. The order fulfillment system as claimed in claim 11, wherein said loop conveyance system includes a cross-belt conveyor.

14. The order fulfillment system as claimed in claim 11, wherein said loop conveyance system includes a plurality of powered rollers.

15. The order fulfillment system as claimed in claim 11, wherein said loop conveyance system includes a plurality of weighing stations.

16. The order fulfillment system as claimed in claim 11, wherein the linear shuttle travels between two rows of said plurality of totes.

17. The order fulfillment system as claimed in claim 11, wherein each of the plurality of primary sortation exits divert objects onto one of a plurality of belted conveyors that leads to one of the shuttle modules of the secondary sortation system, wherein the plurality of belted conveyors include independently controllable sections.

18. The order fulfillment system as claimed in claim 17, wherein the independently controllable sections includes weighing sensors.

19. The order fulfillment system as claimed in claim 11, wherein the plurality of shuttle modules of the secondary sortation system includes a plurality of vertical levels of shuttle modules.

20. The order fulfillment system as claimed in claim 11, wherein the plurality of shuttle modules of the secondary sortation system includes three vertical levels of shuttle modules.

21. An order fulfillment system in which objects to be collected into orders are provided in output totes, said system comprising:
- an input conveyance system that moves objects from an input conveyance system toward a loop conveyance system;
- a primary sortation system that includes the loop conveyance system that moves objects around a closed loop that includes a plurality of primary sortation exits, each of which leads to the secondary sortation system inside the closed loop;
- wherein the secondary sortation system includes a plurality of layered shuttle modules, each shuttle module further including a linear shuttle that travels along a rail to receive an object from one of the plurality of primary sortation exits of the primary sortation system and conveys objects to one of a plurality of totes provided on either side of the rail, said plurality of layered shuttle modules being provided as a plurality of vertically stacked layers,
- wherein each exit of the primary sortation system divert objects onto one of a plurality of conveyors that leads to one of the layered shuttle modules of the secondary sortation system, wherein the plurality of conveyors include downward directing conveyors, level directing conveyors, and upward directing conveyors; and
- the system further comprising an output tote conveyance system for moving completed totes within the closed loop to an output location.

22. The order fulfillment system as claimed in claim 21, wherein said input conveyance system includes a plurality of infeed stations.

23. The order fulfillment system as claimed in claim 21, wherein said loop conveyance system includes a cross-belt conveyor.

24. The order fulfillment system as claimed in claim 21, wherein said loop conveyance system includes a plurality of powered rollers.

25. The order fulfillment system as claimed in claim 21, wherein said loop conveyance system includes a plurality of weighing stations.

26. The order fulfillment system as claimed in claim 21, wherein the linear shuttle travels between two rows of said plurality of totes.

27. The order fulfillment system as claimed in claim 26, wherein the plurality of layered shuttle modules include reciprocating tilt trays.

28. The order fulfillment system as claimed in claim 26, wherein the plurality of layered shuttle modules include reciprocating conveyors.

29. The order fulfillment system as claimed in claim 21, wherein the plurality of layered shuttle modules are provided as three vertical levels of shuttle modules.

30. The order fulfillment system as claimed in claim 21, wherein the output tote conveyance system is located along directions that generally run through a central region of the closed loop.

31. A method of providing order fulfillment in which objects to be collected into orders are provided in output totes, said method comprising:
   moving objects toward a primary sortation system that includes a loop conveyance system generally along a first input direction;
   moving objects around a closed loop of the loop conveyance system that includes a plurality of primary sortation exits, each of which leads to a secondary sortation system inside the closed loop, wherein the secondary sortation system includes a plurality of vertically stacked shuttle modules within the closed loop;
   diverting objects from the plurality of primary sortation exits to the vertically stacked shuttle modules of the secondary sortation system within the closed loop;
   moving an object received at one of the plurality of vertically stacked shuttle modules using a linear shuttle that travels along a rail;
   conveying the object from the linear shuttle to one of a plurality of totes provided on each of opposing sides of the rail using a reciprocating conveyor of the linear shuttle; and
   moving completed totes within the closed loop in a direction that is generally transverse to the first input direction.

32. The method as claimed in claim 31, wherein said loop conveyance system includes a cross-belt conveyor.

33. The method as claimed in claim 31, wherein said loop conveyance system includes a plurality of powered rollers.

34. The method as claimed in claim 31, wherein said loop conveyance system includes a plurality of weighing stations.

35. The method as claimed in claim 31, wherein the linear shuttle travels between two rows of said plurality of totes.

36. The method as claimed in claim 31, wherein each of the plurality of primary sortation exits divert objects onto one of a plurality of belted conveyors that leads to one of the shuttle modules of the secondary sortation system, wherein the plurality of belted conveyors include independently controllable sections.

37. The method as claimed in claim 36, wherein the independently controllable sections includes weighing sensors.

38. The method as claimed in claim 37, wherein the method further includes waiting until an adjacent belted conveyor is empty prior to moving an object onto the adjacent belted conveyor.

39. The method as claimed in claim 31, wherein the plurality of vertically stacked shuttle modules are provided as three vertical levels of shuttle modules.

* * * * *

UNITED STATES PATENT AND TRADEMARK OFFICE
CERTIFICATE OF CORRECTION

PATENT NO. : 11,752,521 B2  
APPLICATION NO. : 16/986984  
DATED : September 12, 2023  
INVENTOR(S) : Christopher Geyer et al.

Page 1 of 1

It is certified that error appears in the above-identified patent and that said Letters Patent is hereby corrected as shown below:

In the Specification

In Column 8, Line 59, should read:
"in FIG. 8."

Signed and Sealed this
Twenty-ninth Day of July, 2025

Coke Morgan Stewart
*Acting Director of the United States Patent and Trademark Office*